US011978179B2

(12) United States Patent
al-Salem

(10) Patent No.: US 11,978,179 B2
(45) Date of Patent: May 7, 2024

(54) IMAGE UPSAMPLING AND DENOISING BY LEARNING PAIRS OF LOW-RESOLUTION DICTIONARIES USING A STRUCTURED SUBSPACE MODEL

(71) Applicant: CICADA Imaging Inc., Riyadh (SA)

(72) Inventor: Faisal M. al-Salem, Riyadh (SA)

(73) Assignee: CICADA Imaging Inc., Riyadh (SA)

( * ) Notice: Subject to any disclaimer, the term of this patent is extended or adjusted under 35 U.S.C. 154(b) by 567 days.

(21) Appl. No.: 17/303,466

(22) Filed: May 28, 2021

(65) Prior Publication Data
US 2021/0304360 A1   Sep. 30, 2021

Related U.S. Application Data

(63) Continuation-in-part of application No. 16/779,121, filed on Jan. 31, 2020, now Pat. No. 11,275,967.
(Continued)

(51) Int. Cl.
*G06K 9/00* (2022.01)
*G06F 18/2135* (2023.01)
(Continued)

(52) U.S. Cl.
CPC ........ *G06T 3/4053* (2013.01); *G06F 18/2135* (2023.01); *G06F 18/214* (2023.01);
(Continued)

(58) Field of Classification Search
CPC ... G06T 3/4053; G06T 3/4023; G06T 3/4076; G06V 20/46; G06V 10/50; G06V 10/774; G06F 18/2148; G06F 18/2135
See application file for complete search history.

(56) References Cited

U.S. PATENT DOCUMENTS 8,665,342 B2 * 3/2014  Al-Salem ............. H04N 23/951
                                                   348/222.1
9,538,126 B2 * 1/2017  al-Salem ................. G06F 18/28
(Continued)

OTHER PUBLICATIONS

Salem, Faisal, and Andrew E. Yagle. "Super-resolution of dynamic scenes using sampling rate diversity." IEEE Transactions on Image Processing 25.8 (2016): 3459-3474. (Year: 2016).*
(Continued)

*Primary Examiner* — Avinash Yentrapati
(74) *Attorney, Agent, or Firm* — Calderon, Safran & Cole P.C.

(57) ABSTRACT

A computational method is disclosed for producing a sequence of high-resolution (HR) images from an input sequence of low-resolution (LR) images. The method uses a structured subspace framework to learn pairs of LR dictionaries from the input LR sequence 'and' employ learned pairs of LR dictionaries into estimating HR images. The structured subspace framework itself is based on a pair of specially structured HR basis matrices, wherein a HR basis spans any HR image whose so-called polyphase components (PPCs) are spanned by the corresponding LR dictionary. The computational method may be used to denoise images, whether LR or HR images, by using the structured subspace framework to learn dictionaries of the images and estimate a denoised version of the images from the learned image dictionaries. The denoising process may be iterated until the noise is reduced below a desired threshold.

13 Claims, 14 Drawing Sheets

Unknown polyphase components (PPCs) of an unknown (HR) frame vs. a set of captured (LR) frames.

Related U.S. Application Data

(60) Provisional application No. 62/874,698, filed on Jul. 16, 2019.

(51) Int. Cl.
*G06F 18/214* (2023.01)
*G06T 3/4053* (2024.01)
*G06T 3/4076* (2024.01)
*G06T 5/70* (2024.01)
*G06V 10/30* (2022.01)
*G06V 10/52* (2022.01)
*G06V 10/772* (2022.01)
*G06V 20/40* (2022.01)

(52) U.S. Cl.
CPC .............. *G06T 3/4076* (2013.01); *G06T 5/70* (2024.01); *G06V 10/30* (2022.01); *G06V 10/52* (2022.01); *G06V 10/772* (2022.01); *G06V 20/46* (2022.01)

(56) References Cited

U.S. PATENT DOCUMENTS

| | | | |
|---|---|---|---|
| 9,693,012 B2* | 6/2017 | al-Salem | H04N 7/0135 |
| 9,781,381 B2 | 10/2017 | Al-Salem et al. | |
| 2021/0019561 A1 | 1/2021 | Al-Salem | |
| 2021/0304360 A1* | 9/2021 | al-Salem | G06V 10/52 |

OTHER PUBLICATIONS

F. Salem and A.E. Yagle, "Non-Parametric Super-Resolution Using a Bi-Sensor Camera," in IEEE Transactions on Multimedia, vol. 15, No. 1, pp. 27-40, Jan. 2013.

F. Salem and A.E. Yagle, "Super-Resolution of Dynamic Scenes Using Sampling Rate Diversity," in IEEE Transactions on Image Processing, vol. 25, No. 8, pp. 3459-3474, Aug. 2016.

* cited by examiner

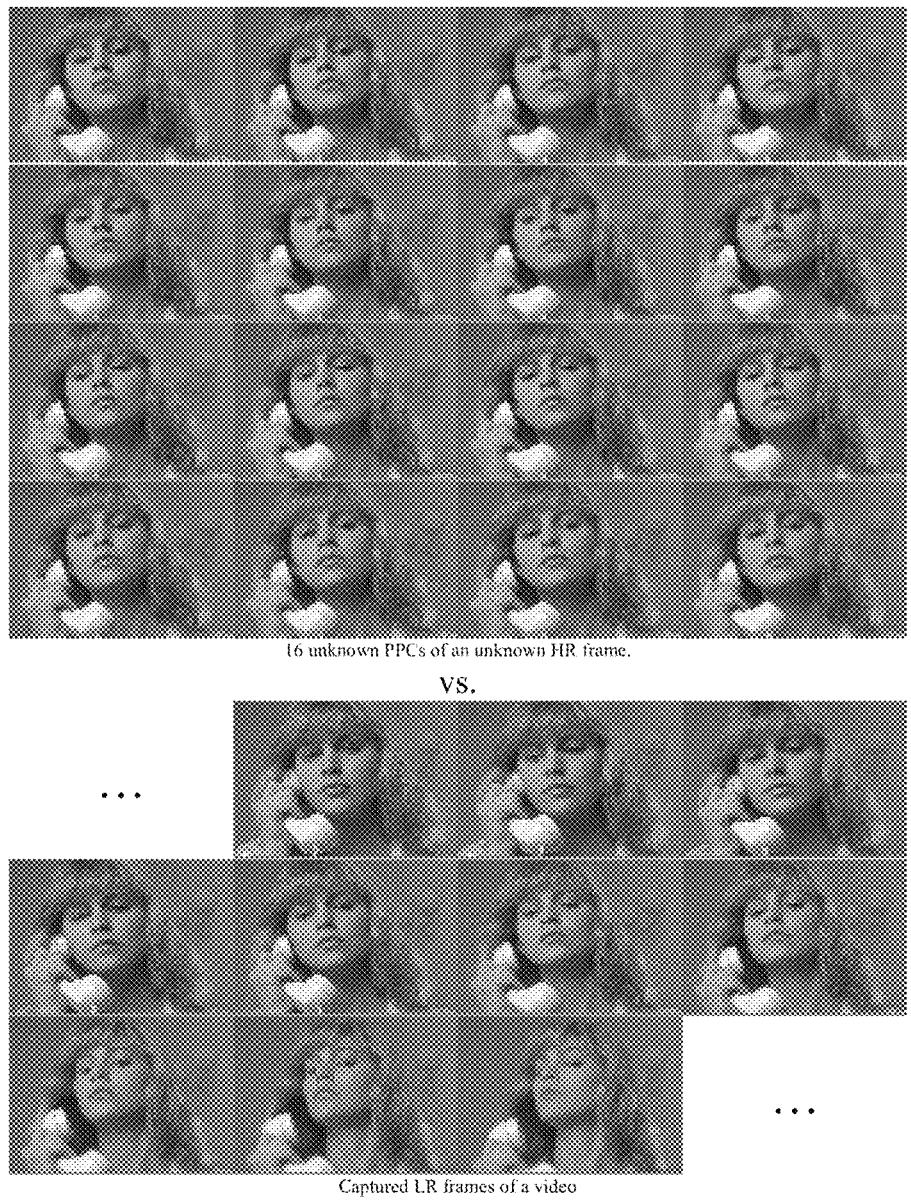
Fig. 1. Unknown polyphase components (PPCs) of an unknown (HR) frame vs. a set of captured (LR) frames.

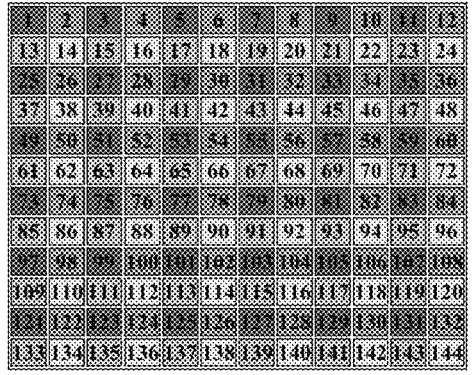
(a) 12×12 HR image (the numbers denote HR image pixel locations)
Decimating the HR image by ×2, we get $2^2 = 4$ PPPCs 
Decimating the HR image by ×3, we get $3^2 = 9$ SPPCs. 
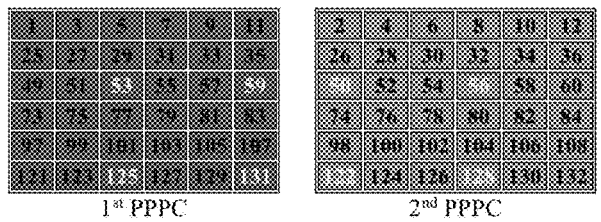
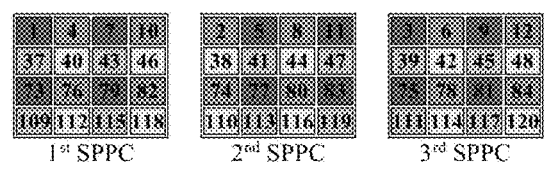
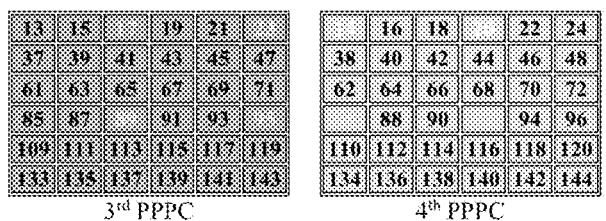
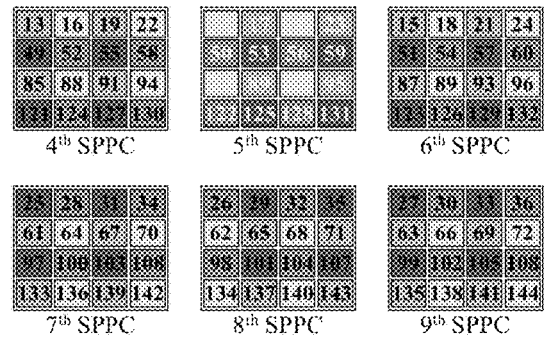
(b) PPPCs of (a)
(c) SPPCs of (a)
Fig. 2. An illustration of the relationships between PPCs corresponding to two different subsampling rates, $p$ and $q = p+1$.

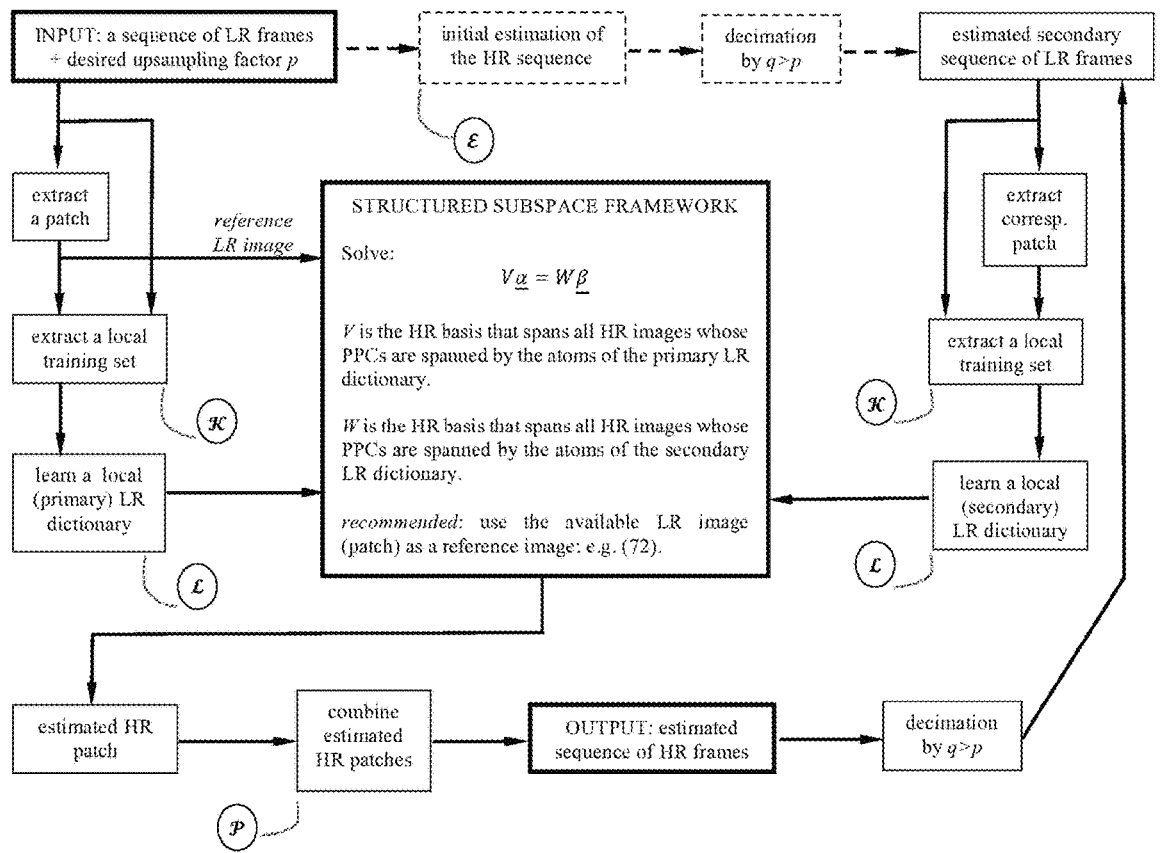
Fig. 3. Flow chart illustrating a basic solution baseline based on the proposed structured subspace model. Note: dashed boxes/lines indicate initial guess operations (which are performed only once, before starting the iterative solution).

Fig. 4. Upsampling experiment ($p = 3$).
Fig. 5. Upsampling experiment ($p = 4$).

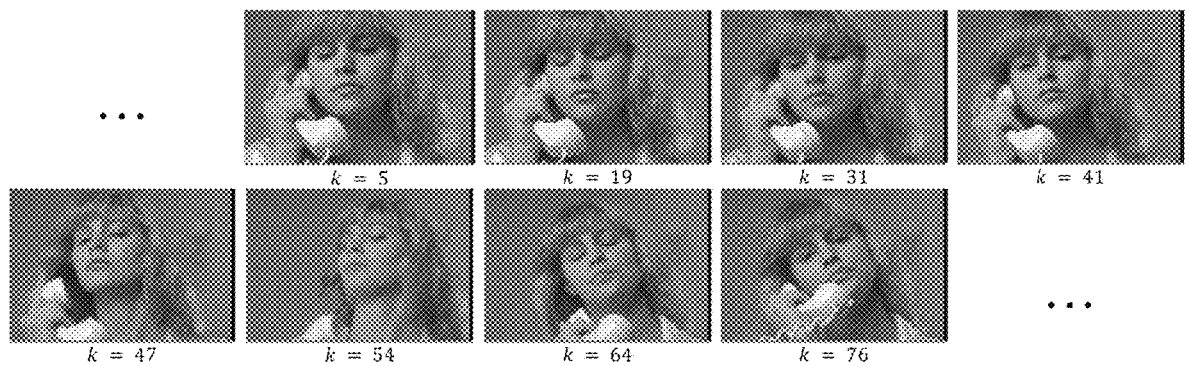
Fig. 6. Sample frames of the primary (available) LR sequence X.
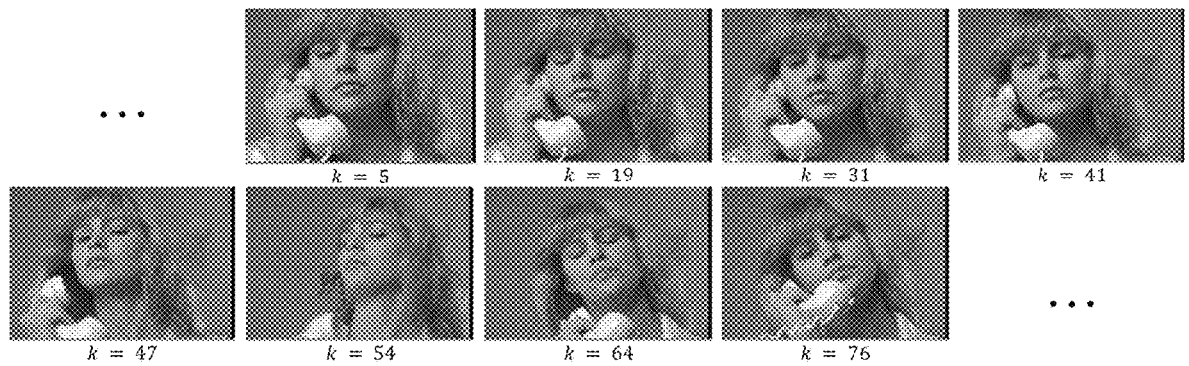
Fig. 7. Sample frames of the initial guess of the HR sequence $\hat{\mathbb{U}}_{(0)}$.

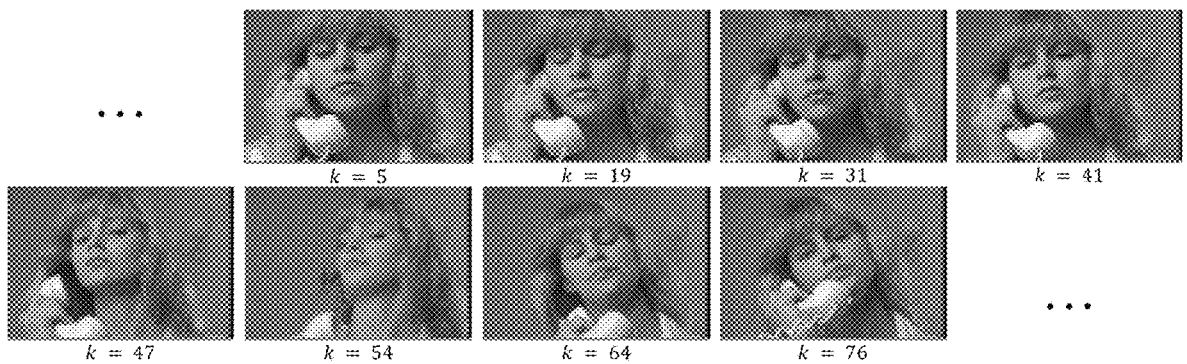
Fig. 8. Sample frames of the first estimate of the secondary (different/lower resolution) LR sequence $\mathbb{Y}_{(1)}$.
Fig. 9. The 31st frame from the primary (originally available) sequence $\mathbb{X}$ vs. the 31st frame from the first estimate of the secondary LR sequence $\mathbb{Y}_{(1)}$. The frames are displayed in this figure with their actual *relative* sizes.

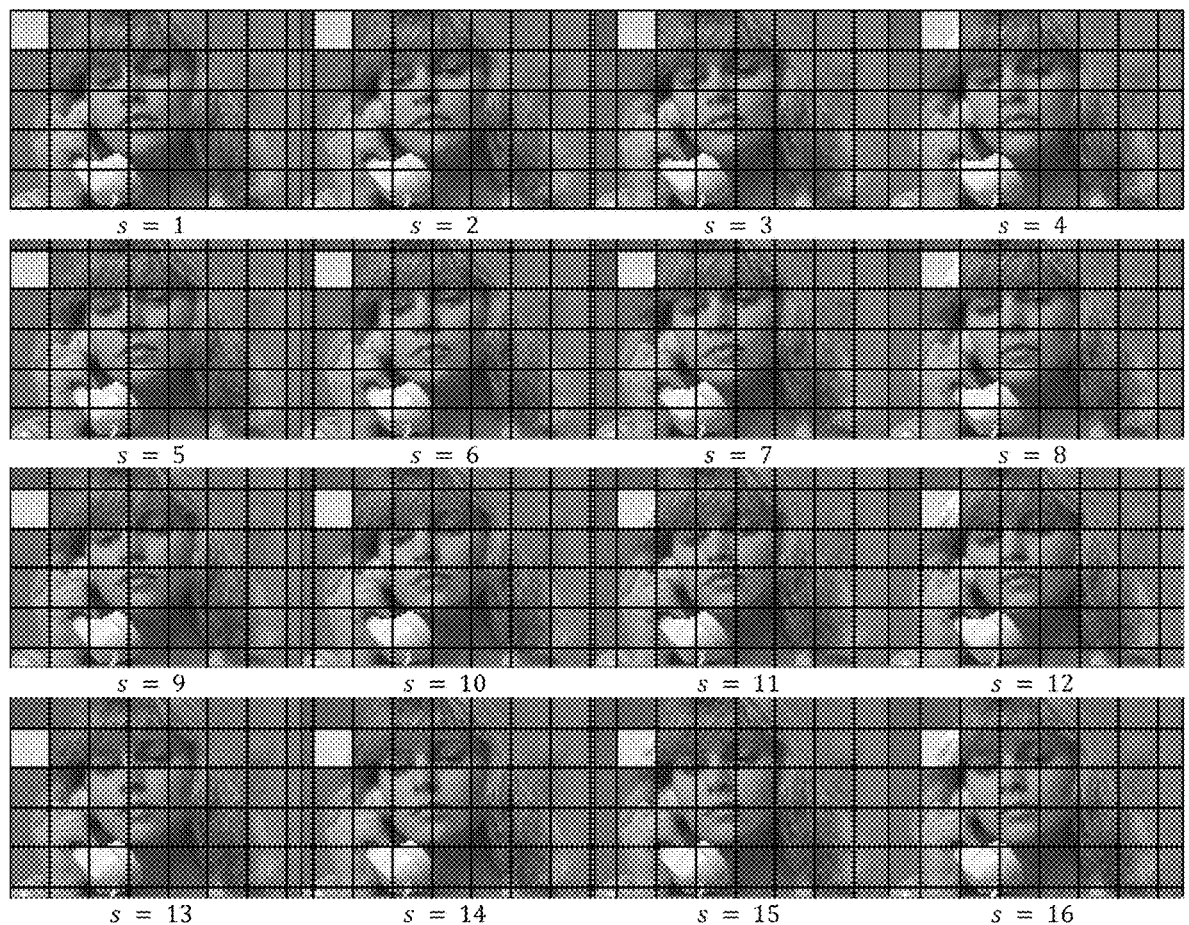
Fig. 10. Frame#31 from the primary sequence $\mathbb{X}$, partitioned in $S = r^2 = 16$ different patterns. The sub-images within (imaginary) black borders are the LR patches $\{x^{k,\ell_s}\}$, where $k = 31$, $s = 1,...,16$, and total number of patches (per pattern $s$) is 48, i.e. $\ell_s = 1,...,48$.

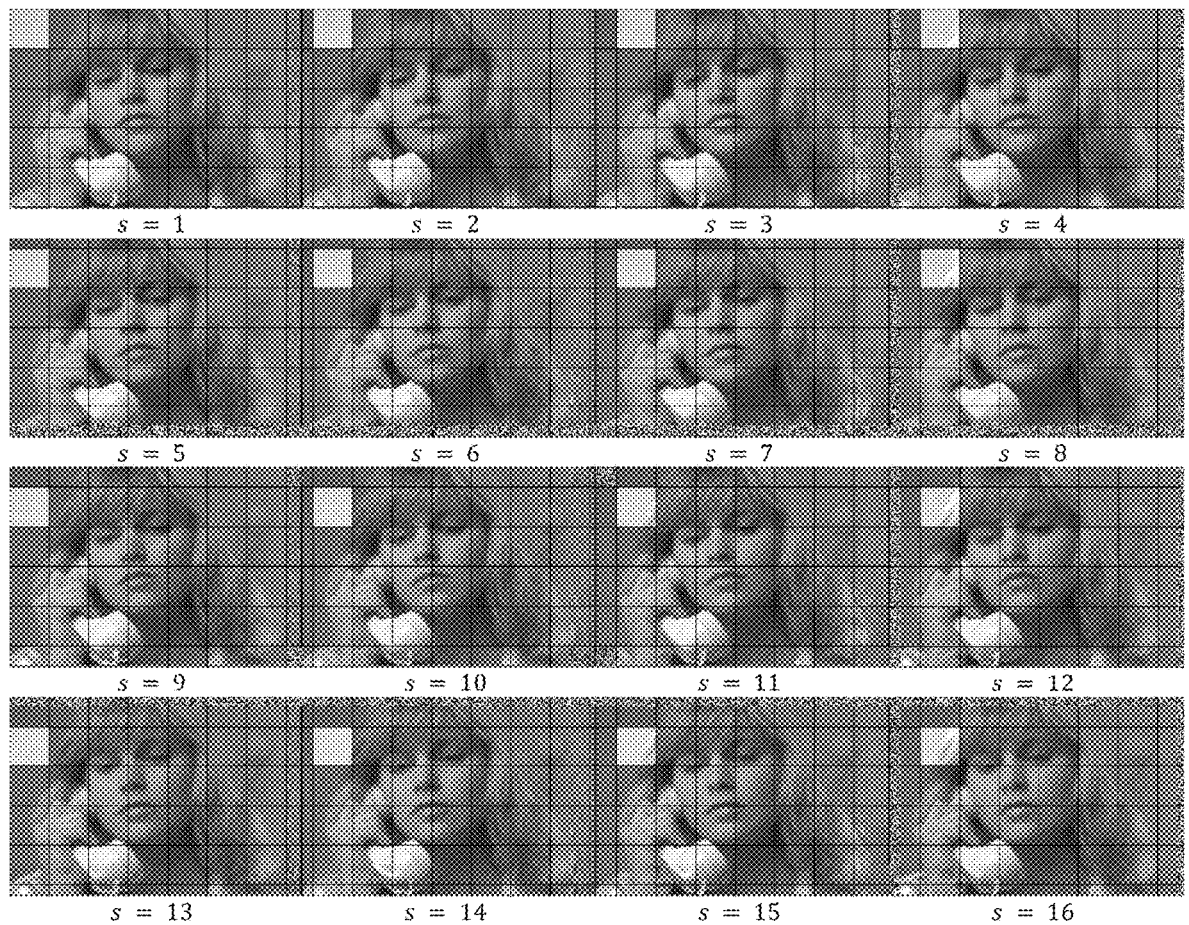
Fig. 11. Multiple HR estimates of frame#31, obtained by tiling (in place) all estimated HR patches $\{\hat{u}_{(1)}^{k\ell_s}\}$, $k = 31$, $s = 1, ..., 16$, and $\ell_s = 1, ..., 48$.

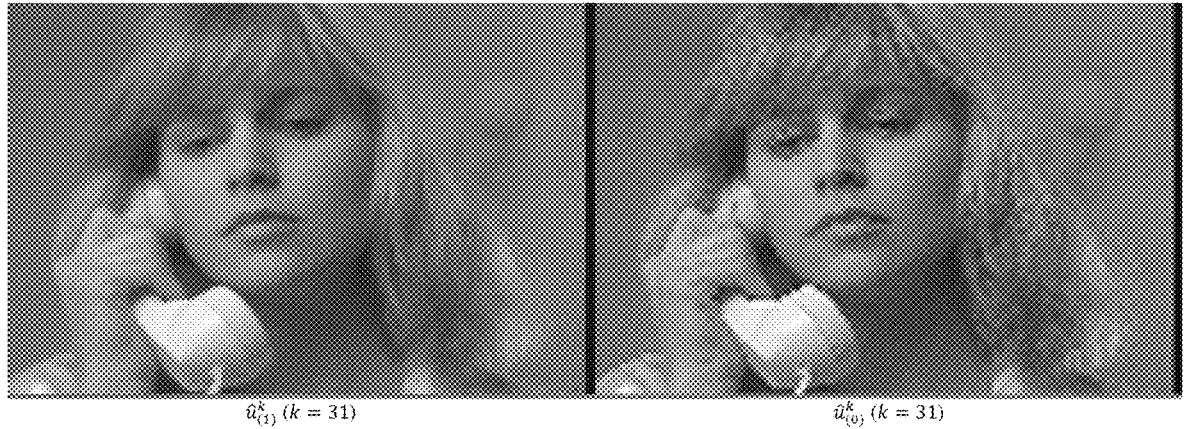
Fig. 12. Taking the median of all $S = 16$ estimates (shown in Fig. 11), we get $\hat{u}^k_{(1)}$ (the *first iteration* estimate) displayed here against the *initial* estimate $\hat{u}^k_{(0)}$ ($k = 31$).
Fig. 13. How did we compute the highlighted estimated HR patch? (the highlighted square is $\hat{u}^{k\ell_s}_{(1)}$ at $k = 31$, $s = 4$, and $\ell_s = 20$)

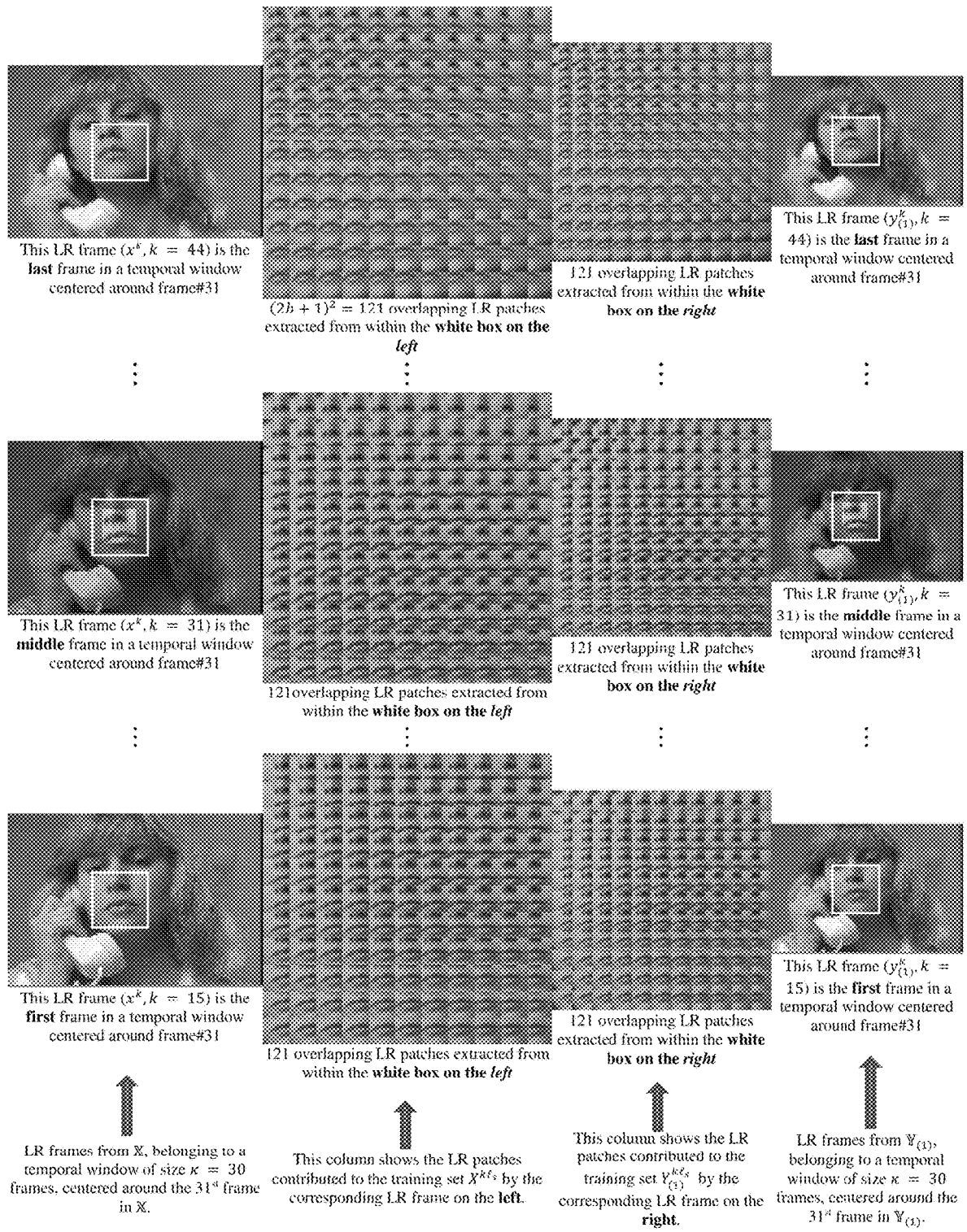
Fig. 14. An illustration of the extraction process of a pair of local LR training sets (needed for computing the HR patch highlighted in Fig. 13).

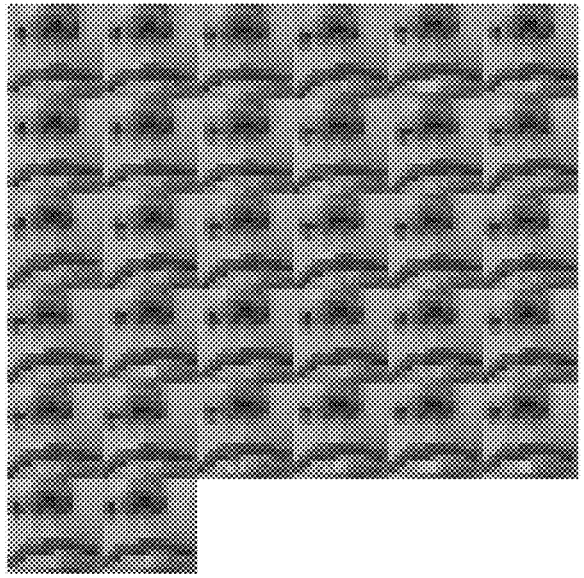

The primary dictionary $\Psi^{k\ell_s}$ contains $M = 32$ atoms, chosen from the training set $X^{k\ell_s}$.

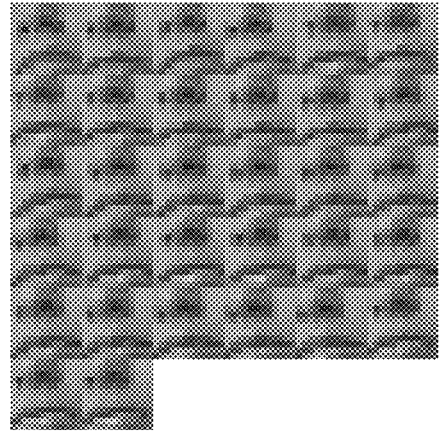

The secondary dictionary $\Phi_{(1)}^{k\ell_s}$ contains $N = 32$ atoms, chosen from the training set $Y_{(1)}^{k\ell_s}$.

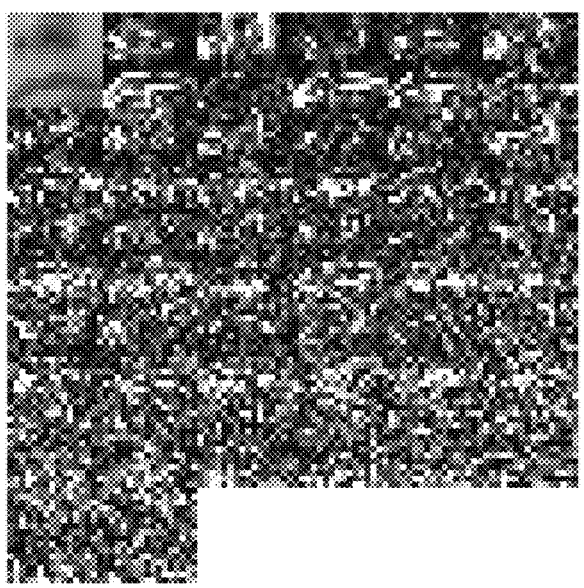

Orthonormalized version of $\Psi^{k\ell_s}$ using SVD.

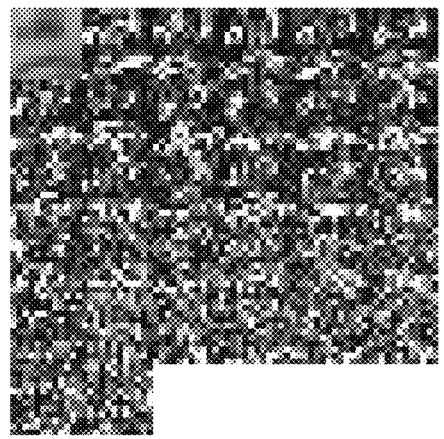

Orthonormalized version of $\Phi_{(1)}^{k\ell_s}$ using SVD.

Fig. 15. The pair of LR dictionaries $\Psi^{k\ell_s}$ and $\Phi_{(1)}^{k\ell_s}$ we used to compute the HR estimate $\hat{u}_{(1)}^{k\ell_s}$ highlighted in Fig. 13.

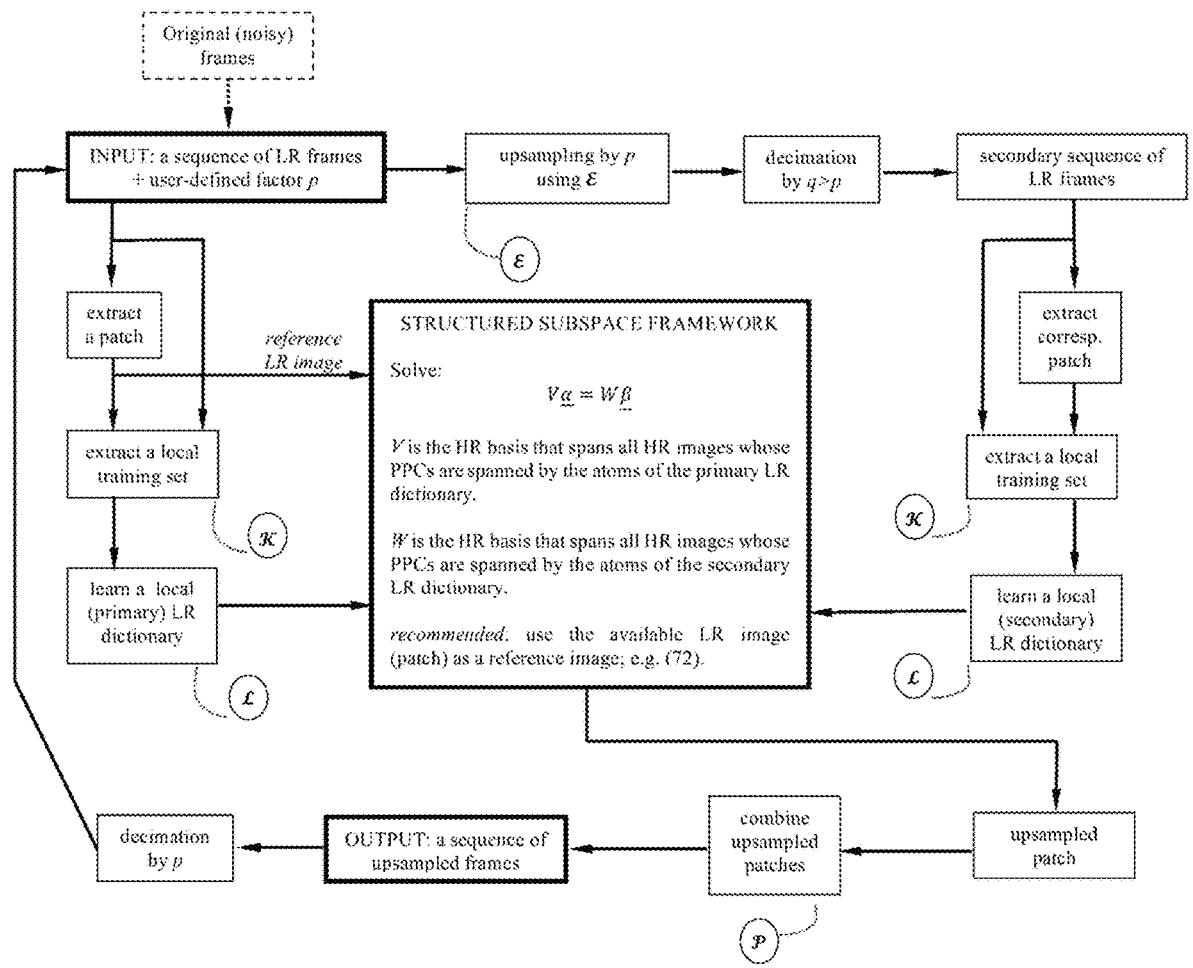
Fig. 16. Flow chart illustrating a modified baseline with the purpose of 'denoising by upsampling'. Note: the dashed box/line indicates that the original (noisy) sequence is used only once (as input to the first iteration only).

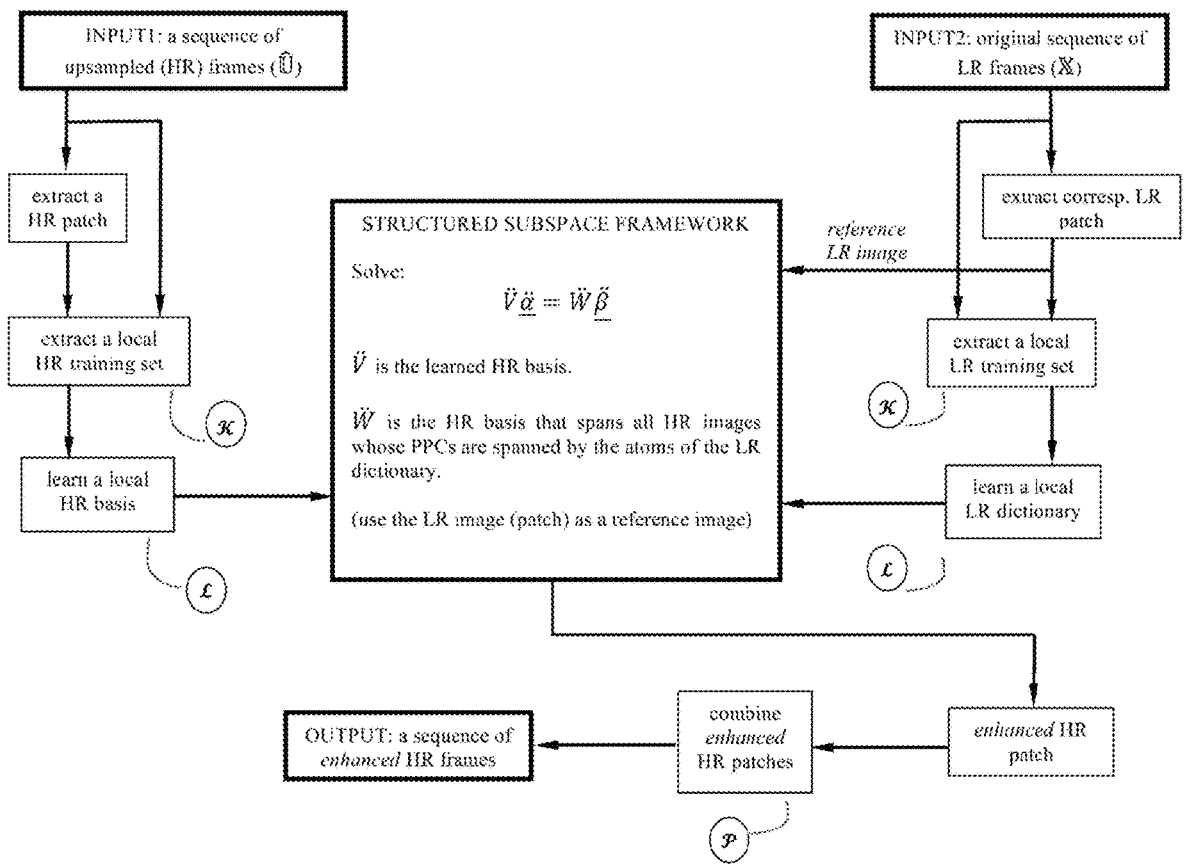
Fig. 17. Flow chart illustrating a baseline leveraging a structured subspace model for *enhancing* an upsampled sequence of images.

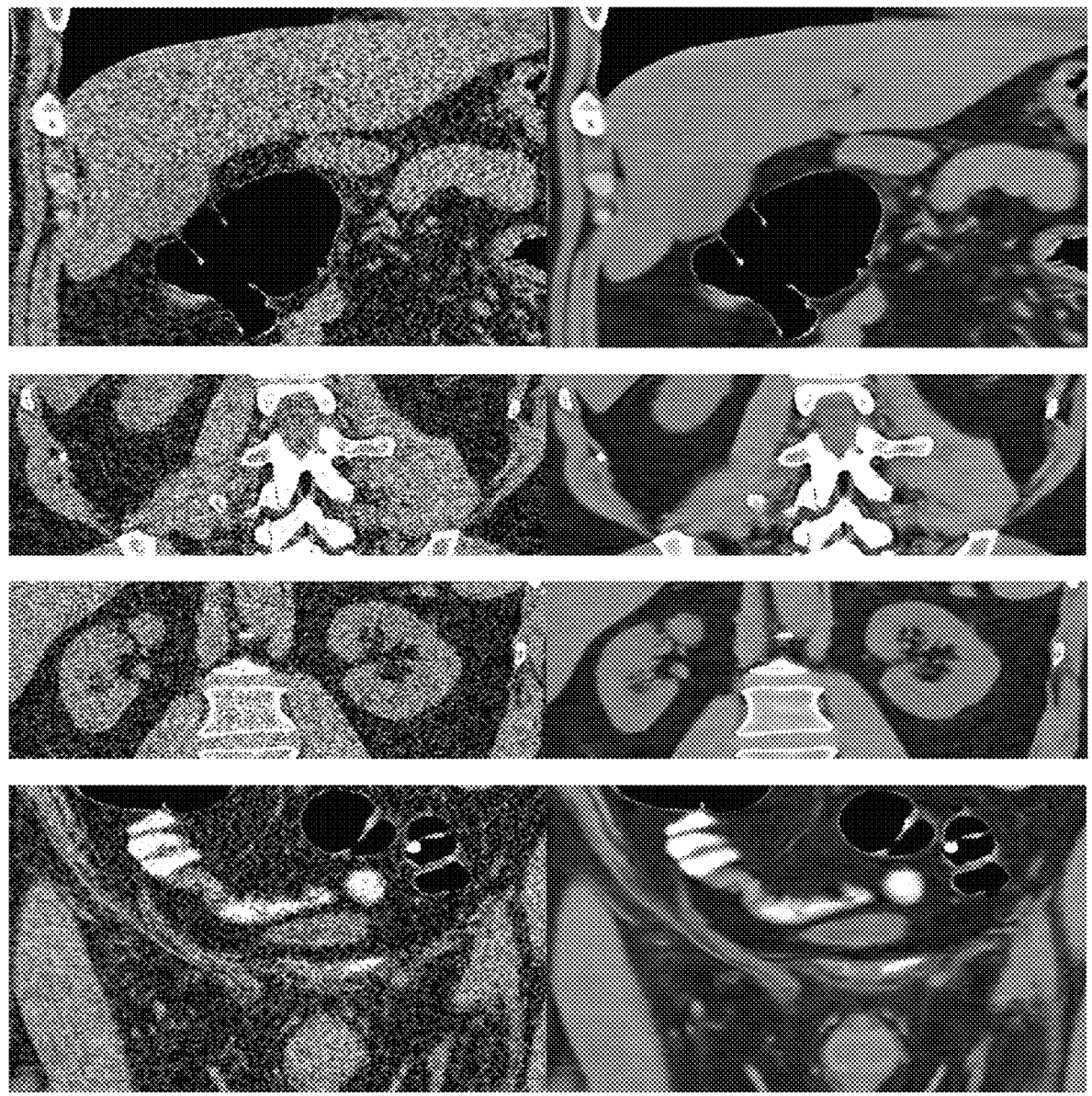
Fig. 18. The left column contains images taken from a real-world colonography sequence (CT-scan). The right column shows the corresponding images after processing the original sequence.

IMAGE UPSAMPLING AND DENOISING BY LEARNING PAIRS OF LOW-RESOLUTION DICTIONARIES USING A STRUCTURED SUBSPACE MODEL

FIELD OF THE INVENTION

The invention relates to a computational method for producing a sequence of high-resolution (HR) images from an input sequence of low-resolution (LR) images. More particularly, the method uses a structured subspace framework to learn pairs of LR dictionaries from the input LR sequence 'and' employ learned pairs of LR dictionaries into estimating HR images. The structured subspace framework itself is based on a pair of specially structured HR basis matrices, wherein a HR basis spans any HR image whose so-called polyphase components (PPCs) are spanned by the corresponding LR dictionary.

BACKGROUND OF THE INVENTION

This work addresses the problem of multiframe upsampling (also known as super-resolution, upscaling, or de-aliasing) wherein, given as input a sequence of low resolution (LR) images, the desired output is their corresponding high resolution (HR) versions. In such a problem, low pixel density (low pixel count per square area) causes loss of resolution. Applications include all imaging technologies that produce a sequence of images (e.g. a video, MRI scan, satellite images, aerial surveillance, etc.) with pixel count that is lower than desired.

The conventional approach to the solution of this problem is motion estimation (or motion modeling) across the captured images. But accurate modeling of (complex) motion patterns requires high enough pixel density: a hopeless egg and chicken paradox the signal processing community has been trying to solve for many years.

Instead of the motion estimation route, we adopt a 'signal representation' approach (also known as the example-based, training-based or dictionary learning-based approach), which we summarize its relevant (previous) results as follows.

Fact 1

In the machine learning and signal processing communities, it has long been established that given a few samples (partial measurements) of an unknown (HR) image, the entire image can be recovered with reasonable accuracy depending on two main factors: 1—The severity of undersampling; and, 2—The existence of an efficient dictionary (basis) that can represent the HR image well with only a few dictionary atoms. In particular, the more undersampled the image, the more efficient the dictionary needs to be to be able to recover the unknown HR image given partial measurements of it (the available reference (LR) image).

OBSTACLE to Fact 1: creation of a dictionary that can efficiently represent an image is a process known in the machine learning community as: dictionary learning or training. However, the efficiency of a dictionary (for representing a particular image) does not only depend on the learning method in use, but it is also highly dependent on the data (images) used to train the dictionary (efficiency of the dictionary is highly dependent on the training set). In particular, the narrower the training set, the more efficient the learned dictionary would be, even regardless of the learning process. A training set is said to be narrow if the training images (also known as example images) belong to a narrow subclass of images (that also include the sought-after image).

What this means in practice is that if the goal is to recover the HR version of a license plate, say, given only a LR version of it, then a training set extracted from high quality example license plate images would be far more useful than a training set based on generic images. In short, the more specialized the training set, the better the outcome. On the other hand, using specialized (narrow) training sets of HR images to learn efficient dictionaries would be entirely useless for estimating generic images. For example, if your training set is made up of HR images of license plates, the learned dictionaries would be completely useless for estimating any images other than license plates.

Fact 2

A simple fact of signal processing is that any 2D signal can be decomposed into multiple LR versions of it, the so-called polyphase components (PPCs), via the basic operations of (2D) shifting and subsampling (decimation). Specifically, for a decimation (subsampling) factor of p, an image can be decomposed into $p^2$ PPCs. The first PPC is obtained by starting with the first pixel in the first row of the image, and then decimating (vertically and horizontally) by p. Decimating, starting with the second pixel in the first row, we get the second PPC, and so forth. For example, the (p+1)th PPC is obtained by decimating starting with the first pixel in the second row, and the last $p^2$-th PPC is the result of decimating beginning with the p-th pixel in the p-th row of the image. Therefore, a HR image can be trivially reconstructed from its PPCs simply by interlacing them.

Fact 3

A LR sequence of images (e.g. a LR video) can provide a very narrow training set for the PPCs of (the sought after) HR frames. To put it differently, if we have a sequence of LR images, then why not shift our focus from estimating the unknown HR frames, to estimating the (the low-resolution) PPCs (of each HR frame) instead? FIG. 1 easily demonstrates the potential of this idea. In other words, simply by looking at FIG. 1, it becomes evident that a sequence of LR images can easily provide very narrow training sets for the PPCs of HR images, thus circumventing the obstacle mentioned under Fact 1 above.

OBSTACLE 1 to Fact 3: While Fact 3 avoids the obstacle associated with Fact 1, it introduces the MAJOR issue of lack of 'partial measurements'. To be more specific, even if we have available a very efficient dictionary for representing an (unknown) image, Fact 1 tells us that if NO partial measurements of it exist, then the efficient dictionary is of NO value.

Now, since Fact 3 suggests using a LR sequence to train efficient dictionaries for the PPCs of a HR frame, the signals that need to be estimated in this case are the PPCs themselves (the target images in a solution based on Fact 3 are the PPCs, from which the HR image is trivially reconstructed). However, without partial measurements for each target signal (each PPC), there is no way to go further along the route of Fact 3.

OBSTACLE 2 to Fact 3: Almost all example-based (aka dictionary-based or training-based) upsampling methods use patch-based processing, which simply means that local sub-regions of a HR frame are estimated instead of estimating the entire HR frame as a whole. In a solution scenario that involves Fact 3, patch-based processing would be essential if the scene is dynamic (changing quickly across the captured frames). However, working on small patches would require regularization, which simply means adding useful information to make up for the scarcity of the data (that comes from working on small patches).

Previous 'Enablers' of Fact 3

To resolve OBSTACLE 1 under Fact 3, the authors of U.S. Pat. No. 8,665,342 ("[1]" hereafter) (incorporated herein by reference) proposed exploiting relationships between PPCs corresponding to different decimating factors. Their proposed solution entailed an imaging hardware modification. In particular, their solution would work only for optical imaging systems (cameras) where a secondary sensor, with a different sampling rate (different resolution sensor), must be incorporated into the camera such that it would have the same line of sight as that of the primary sensor (by incorporating, for example, a beam splitter so that both sensors 'see' the same scene at the same time).

In what follows, we present the basic premise the authors of the '342 patent used as an 'enabler' of Fact 3 (the same enabler remains the foundation of the work in U.S. Pat. Nos. 9,538,126; 9,693,012 and 9,781,381. Each of which is incorporated herein by reference) ("[2]" hereafter). Note: We simply do NOT use said premise in our current solution. Indeed, the reason we include this section is only to help the interested reader to gauge how markedly different our current approach is.

In [1], [2], the job of the secondary sensor is to provide the missing 'partial measurements' for the target signals of Fact 3 (the PPCs). In particular, each secondary frame (captured by the secondary sensor) is decimated into multiple (even lower resolution) images each of which provides partial measurements for each PPC that need to be estimated. In the following, we provide a quick review of how the relationships between PPCs was exploited by [1] and [2] for image upsampling. FIG. 2 gives an illustration of decomposing the same 12×12 HR image (color-coded for ease of demonstration) into two different sets of PPCs corresponding to different subsampling rates, p and q=p+1. The first (primary) set, shown in FIG. 2(b), contains 4 (primary) polyphase components (PPPCs), each corresponding to the same (primary) decimation factor of p=2. FIG. 1(c) shows the second (or secondary) set, which consists of 9 (secondary) polyphase components (SPPCs), each corresponding to the same (secondary) decimation factor of q=3.

Given either set of PPCs (the PPPCs or the SPPCs), the HR image can be recovered simply by interlacing the PPCs (from either set). Therefore, if we use the LR images (captured by the camera) to create a representative dictionary (of the same low resolution level) for representing the PPPCs, then we can ultimately reconstruct the HR image simply by finding the representations of the PPPCs in terms of said dictionary. However, without knowing any partial measurements for each PPPC, such a scenario would be impossible. Nonetheless, a careful examination of FIG. 2 reveals that, although we do not know any of the PPCs (neither the PPPCs nor the SPPCs), if we know a single SPPC, then we already know a decimated version of each PPPC. For example, suppose we know the middle (5th) SPPC, then we get a decimated version of all 4 PPPCs. Moreover, the locations of these known pixels provided by the (assumed) known SPPC are unique for each PPPC. Hence, if the camera is (additionally) equipped with different (lower) resolution secondary sensor, with a sampling rate that matches the subsampling rate of the SPPCs, then a captured secondary LR frame can play the role of a reference SPPC (a reference secondary LR image) that provides the needed partial measurements for the PPPCs, and the HR sequence can thus be estimated (see [1], [2] for details).

For the case of 'dynamic scenes' (OBSTACLE 2 under Fact 3), the work in [2] proposes regularization in the form of the so-called anchors, as well as generative Gaussian models (GGMs), such that working on small patches of a frame, rather than the whole frame at once, becomes possible.

SUMMARY OF THE INVENTION

A Structured Subspace Perspective as a 'Powerful Enabler' of Fact 3

To recap, Fact 1 and Fact 2 are well known. Fact 3, while quite obvious (given Fact 1 and Fact 2), needed an enabler to get over obstacles associated with it. Previous enablers came in the form of an imaging hardware modification coupled with regularization (for dynamic scenes).

Spatial resolution is, obviously, a very fundamental aspect of image quality, so much so that when the physical constraints of an imaging system force us to choose between many important features, sufficient pixel density comes on top of the list of priorities, overshadowing other important requirements such as high dynamic range, or high-speed imaging, for example. Even in non-optical imaging modalities (where samples are not captured in the spatial domain), the pixel density can be severely limited by the physics of the imaging technology unless other useful features are sacrificed. Take medical imaging for instance. Doctors would not likely accept low resolution images albeit for the sake of a higher density of image 'slices' (per organ), lower radiation doses or shorter scanning times.

Said differently, the reason why upsampling can be such a powerful tool is the fact that pixel density can be traded with so many very important imaging qualities (freezing motion blur, reduced noise, reduced crosstalk, higher sensitivity, higher dynamic range, smaller size, cost and complexity of the imaging system, higher frame rate, reduced scanning time, reduced radiation dose, reduced slice thickness, adding angular resolution, and, of course, larger field of view). But pixel density is of such utmost importance that all of the aforementioned imaging aspects are normally sacrificed to satisfy the basic requirement of adequate pixel density, after-all, who wants pixelated images? Upsampling offers the daring solution of turning the table on its head and sacrifice pixels for the sake of other qualities (and then, thereafter, restoring the missing pixels to acceptable quality). Upsampling is therefore a very fundamental problem, and provided there exists a good enough solution, everyone would want a piece of it. A word search of the US patent database for recent patents on upsampling—also known as super-resolution, upscaling, de-aliasing—would find that many big corporations have patents on upsampling/super-resolution solutions.

In the current invention, we entirely forsake the notion of partial measurements for the PPCs (which necessitates a bi-sensor camera setup of [1], [2]). Instead, we adopt a structured subspace perspective, which allows us to relax the condition of the availability (from the onset) of a secondary LR sequence. In particular, the standpoint of beginning the solution with an 'initial guess' of a secondary sequence of images is at odds with a designated task of providing 'the partial measurements'. By contrast, an initial guess of the missing sequence is admissible within the new solution model, as shall become apparent in the remainder of this disclosure.

In particular, the new structured subspace perspective adopted by this invention constitutes a purely algorithmic 'enabler' of Fact 3, and it renders previous enablers of Fact 3 obsolete. In other words, the current proposed solution, while based on the (well known) Fact 1, (well known) Fact 2 and (obvious) Fact 3, requires NO hardware modification (no secondary sensor/beam splitter are required) and it does NOT require any regularization for the case of dynamic scenes. Additionally, this would extend the sphere of applications beyond optical imaging systems (such as medical imaging systems, for example, which are non-optical systems).

In this disclosure, we show how the structured subspace perspective can be used to eliminate the (conventionally) basic requirement of 'partial measurements'. Said differently, estimating a signal (PPCs in the context of Fact 3), without having some partial measurements of it, is quite simply heretofore unknown. By contrast, the structured subspace model we adopt here, completely circumvents the issue of partial measurements (for PPCs) by seeking representations of HR images in terms of specially structured HR bases (instead of seeking representations of PPCs in terms of LR dictionaries as was the case in [1], [2]).

In particular, the HR bases we use are structured such that they span all HR images whose PPCs are spanned by LR dictionaries learned from the available sequence of LR images. In other words, instead of the 'brute force' exploitation of the relationships between PPCs corresponding to different subsampling rates (which necessitates a hardware modification, beam splitter etc.), the new structured model herein, in effect, 'seamlessly' embeds these relationships, making the essential issue of partial measurements irrelevant, thus capitalizing, without hindrance, on the obvious fact that a sequence of LR images can be used to provide the best (narrowest) training sets for the PPCs of HR images (FIG. 1).

The structured subspace framework is based on estimating the representations of the sought-after HR image in terms of a pair of HR bases, each of which is embedding a (different resolution) LR dictionary. Specifically, the structured subspace framework can be summarized with the following equation (which is to be solved whichever— meaningful—way possible)

$$V\underline{\alpha} = W\underline{\beta}$$

where:

V is the first HR basis matrix constructed such that it spans any HR image whose PPCs are spanned by the LR dictionary $\Psi$.

W is the second HR basis matrix constructed such that it spans any HR image whose PPCs are spanned by another (different resolution) LR dictionary $\Phi$.

$\underline{\alpha}$ is the representation of the HR image in terms of V.

$\underline{\beta}$ is the representation of the HR image in terms of W.

Imaging applications that can benefit from upsampling using the disclosed technique:

a) Medical imaging. For example, a magnetic resonance imaging (MRI) system cannot produce an MRI sequence with high density of 'slices' without sacrificing the spatial resolution per slice. This is akin to how a camera cannot capture very high frame rate videos without sacrificing the resolution per frame (regardless of the price tag).

b) Other applications, where upsampling can computationally make up for the need to sacrifice spatial resolution, include high dynamic range imaging, thermal cameras, flash LADAR/LIDAR and light field imaging.

c) Situations that require large distance imaging, yet a large field of view (FOV) is desired (avoiding optically zooming in on a small portion of the FOV). Gigapixel cameras (hundreds of sensors housed in a giant camera) are needed for this reason. With reliable upsampling, a frame captured with a resolution of 100 Mega pixels can be blown up to 1.6 Giga pixels, for example. The ability to cover larger field of view (while computationally making up for the loss of resolution) is very useful in remote sensing, surveillance, search and rescue, etc.

d) Consumer/commercial applications. Examples include turning a cell phone camera into a very high-resolution camera, and upconverting a standard-definition video (SDTV) signal to an ultra-high definition video (UHDTV), to match the resolution of high-definition displays.

e) "Denoising by upsampling": the described techniques can be used to denoise images, of either LR or HR origination. 'Low-resolution (LR)' not only means low-number of pixels, but it also means 'noisy' images. Similarly, the term 'high-resolution (HR)' here simply means 'upsampled' (primarily for the purpose of noise removal).

BRIEF DESCRIPTION OF THE DRAWINGS

FIG. 1 shows unknown polyphase components (PPCs) of an unknown (HR) frame vs. a set of captured (LR) frames.

FIG. 2 is an illustration of the relationships between PPCs corresponding to two different subsampling rates, p and q=p+1.

FIG. 3 is a Flow chart illustrating a basic solution baseline based on the proposed structured subspace model. Note: dashed boxes/lines indicate initial guess operations (which are performed only once, before starting the iterative solution).

FIG. 4 is a series of LR to HR image upsampling experiment (p=3).

FIG. 5 is a series of LR to HR image upsampling experiment (p=4).

FIG. 6 is a series of sample frames of the primary (available) LR sequence $\mathbb{X}$.

FIG. 7 is a series of sample frames of the initial guess of the HR sequence $\hat{\mathbb{U}}_{(0)}$.

FIG. 8 is a series of sample frames of the first estimate of the secondary (different/lower resolution) LR sequence $\mathbb{Y}_{(1)}$.

FIG. 9 is the 31$^{st}$ frame from the primary (originally available) sequence $\mathbb{X}$ vs. the 31$^{st}$ frame from the first estimate of the secondary LR sequence $\mathbb{Y}_{(1)}$. The frames are displayed in this figure with their actual relative sizes.

FIG. 10 is frame #31 from the primary sequence $\mathbb{X}$, partitioned in S=r$^2$=16 different patterns. The sub-images within (imaginary) black borders are the LR patches $\{x^{k l_s}\}$, where k=31, s=1, ..., 16, and total number of patches (per pattern s) is 48, i.e. $l_s$=1, ..., 48.

FIG. 11 shows multiple HR estimates of frame#31, obtained by tiling all estimated HR patches $\{\hat{u}_{(1)}^{k l_s}\}$, k=31, s=1, ..., 16, and $l_s$=1, ..., 48.

FIG. 12 shows $\hat{u}_{(1)}^k$ (the first iteration estimate) displayed against the initial estimate $\hat{u}_{(0)}^k$ (k=31), where $\hat{u}_{(1)}^k$ is obtained by computing the median of all estimates shown in FIG. 11.

FIG. 13 highlights an estimated HR patch $\hat{u}_{(1)}^{k l_s}$ at k=31, s=4, and $l_s$=20.

FIG. 14 is an illustration of the extraction process of a pair of local LR training sets (needed for computing the HR patch highlighted in FIG. 13).

FIG. 15 is the pair of LR dictionaries $\Psi^{kl_s}$ and $\Phi_{(1)}{}^{kl_s}$ we used to compute the HR estimate $\hat{u}_{(1)}{}^{kl_s}$ highlighted in FIG. 13.

FIG. 16 is a flow chart illustrating a modified baseline with the purpose of 'denoising by upsampling'. Note: the dashed box/line indicates that the original (noisy) sequence is used only once (as input to the first iteration only).

FIG. 17 is a flow chart illustrating a baseline leveraging a structured subspace model for enhancing an upsampled sequence of images.

FIG. 18 shows images taken from a real-world colonography sequence (CT-scan) in the left column, and the corresponding images after processing the original sequence in the right column.

DETAILED DESCRIPTION OF THE INVENTION

Estimating HR images based on LR dictionaries is a notion that is quite alien to conventional wisdom. Indeed, image upsampling would be an intrinsically simple problem if all it takes to solve it is to "learn" LR dictionaries from a LR sequence, but could it really be that simple? The answer by the authors of [1], [2] (above) was 'no', unless the issue of partial measurements for the PPCs is resolved via an imaging hardware modification.

Adding the structured subspace perspective, however, reveals that no imaging hardware modification is necessary, and that the problem can indeed be solved solely by learning LR dictionaries. Before we proceed with solution details, we would like first to list a few assumptions, acronyms, and notational conventions that will be used in describing the details.

1—Without loss of generality, we assume that the HR image, we seek to estimate, is square, and with a dimension that is an integer multiple of pq, where p is the primary decimation factor (equivalently, p is also the desired upsampling factor), and q is the secondary decimation factor, with the added assumption that $$q=p+1. \quad (1)$$

Namely, if we let u denote the HR image, then u is a matrix of size d×d, where $$d=rpq, \quad (2)$$

and r is a positive integer.

2—The acronym PPCs stands for polyphase components. PPCs associated with the primary decimation factor p are called primary PPCs or PPPCs for short. SPPCs is the acronym for secondary PPCs, which are associated with the secondary decimation factor q.

3—An underlined symbol denotes a (column) vector. Underlined symbols are also used to denote the vector form of matrices. To elaborate, vec(.) is conventionally used to denote the vectorization operator, which turns a matrix into its (column) vector form (by lexicographical reordering of its elements). Therefore, if symbol A is used to denote a matrix, then $\underline{A}$ is shorthand for vec(A).

4—The (vector) subspace that contains all (real) vectors (or signals) with dimension n is denoted by $\mathbb{R}^n$. For example, writing $\underline{u} \in \mathbb{R}^{d^2}$ is simply saying that $\underline{u}$ (the HR image, in vector form), is in $\mathbb{R}^{d^2}$, and thus has dimension $d^2$. Similarly, $\mathbb{R}^{m \times n}$ denotes the subspace of all (real) matrices of size m×n.

5—We denote the identity matrix with the letter I. If a subscript is added, then it signifies the dimension of the identity matrix. For example, $I_n$ is the identity matrix with dimension n. Also, for an all zero matrix, we use the letter O.

6—The transpose of a matrix (or a vector) is always denoted by adding the superscript '*'. For example, if A is a matrix, then its transpose is denoted by A*.

7—A binary matrix $A \in \mathbb{R}^{m \times n}$ is a matrix whose entries are either "0" or "1". A binary matrix A that is tall or square (m≥n), with each of its columns containing a sole "1" can be encoded (parameterized) as follows. Let $\pi_m^A(k)$ denote the row-index of the sole "1" in the k-th column of A, then the set of all n row-indices $\pi_m^A(1:n)$, completely encodes A (1:n is shorthand for k=1, 2, . . . , n). Note, if m=n, we drop the subscript m. For example, $$\pi_4^A(1:3) = [\,2 \ \ 3 \ \ 1\,] \text{ encodes } A = \begin{bmatrix} 0 & 0 & 1 \\ 1 & 0 & 0 \\ 0 & 1 & 0 \\ 0 & 0 & 0 \end{bmatrix}, \text{ and}$$

$$\pi^B(1:3) = [\,3 \ \ 2 \ \ 3\,] \text{ encodes } B = \begin{bmatrix} 0 & 0 & 0 \\ 0 & 1 & 0 \\ 1 & 0 & 1 \end{bmatrix}.$$

8—We denote the Kronecker product and the Hadamard (element-wise) product, using the symbols $\otimes$ and $\odot$, respectively. Also, the so-called 'direct sum' is denoted by $\oplus$. In particular, the notation $\oplus_{k=1}^s A$ is exactly equivalent to $I_s \otimes A$. In other words, if $A \in \mathbb{R}^{m \times n}$, then $\oplus_{k=1}^s A$ is simply a matrix of size sm×sn that has s 'replicas' of A along the main diagonal (and zeros everywhere else).

9—We use the expression mod(a,b) as a shorthand for 'a modulo b'. Also, GCD(a,b) is the 'greatest common divisor of a and b'.

10—Finally, if c is a real number, the smallest integer greater than or equal to c (the 'ceiling' of c) is denoted by $\lceil c \rceil$. On the other hand, $\lfloor c \rfloor$ denotes the largest integer smaller than or equal to c (i.e., $\lfloor c \rfloor$ is the 'floor' of c).

1. A HR Subspace Based on a LR Dictionary

Laying the foundation for our proposed structured subspace-based framework begins with asking (and answering) the following question: suppose we have available a LR dictionary that spans the PPCs of the sought after HR image, how do we construct the 'basis matrix' of the subspace of all HR images whose PPCs are spanned by said dictionary?

The answer to that question lies in the basic fact that, instead of simply interlacing its PPCs, a HR image, $\underline{u} \in \mathbb{R}^{d \times d}$, can alternatively be constructed from its PPCs, by adding up zero-filled and shifted versions of the PPCs. Said differently, the answer to that question begins by analytically expressing the HR image in terms of its PPCs.

Specifically, let $\{f_i\}_{i=1}^{p^2} \in \mathbb{R}^{rq \times rq}$ denote the set of all $p^2$ PPPCs of the HR image (corresponding to the primary decimation factor p), then $$u = \sum_{i=1}^{p^2} S_{m_p(i)} (Z_p f_i Z_p^*) S_{n_p(i)}^* \quad (3)$$

$$= \sum_{i=1}^{p^2} (S_{m_p(i)} Z_p) f_i (Z_p^* S_{n_p(i)}^*),$$

where $Z_p \in \mathbb{R}^{d \times rq}$ zero-fills the columns by a factor of p (zero-filling 'upsamples' a vector by inserting p−1 zeros between any two elements, and p−1 zeros after the last element), post-multiplying with $Z_p^*$ zero-fills the rows, $S_{m_p(i)} \in \mathbb{R}^{d \times d}$ circularly shifts by $m_p(i)$ rows down, and post-multiplying by $S_{n_p(i)}^* \in \mathbb{R}^{d \times d}$ circularly shifts by $n_p(i)$ columns to the right. Both $S_{m_p(i)}$ and $S_{n_p(i)}^*$ are therefore (cyclic) permutation matrices, where $m_p(i)$ and $n_p(i)$ are in correspondence with the location of the i-th PPPC $f_i$ on the HR grid, and are given by $$m_p(i) = \left\lceil \frac{i}{p} \right\rceil - 1, \tag{4}$$

$$n_p(i) = \mathrm{mod}(i-1, p),$$

Using the fact that zero-filling matrices and circular shifting matrices are binary matrices with the property that each column contains a sole "1", the row-indices of the "1" elements give us a full description of such matrices. In particular, the expression $$\pi_d^{Z_p}(k) = 1 + (k-1)p,$$

$$k = 1, 2, \ldots, rq \tag{5}$$

which encodes the zero-filling matrix $Z_p$, gives us all we need to know to construct $Z_p$. Specifically, equation (5) literally says that $Z_p$ is of size d×rq, and that the k-th column has a "1" located at row $\pi_d^{Z_p}(k)$.

Similarly, the shifting matrices $S_{m_p(i)}$ and $S_{n_p(i)}$ can be expressed as follows (without using the subscript d since $S_{m_p(i)}$ and $S_{n_p(i)}$ are square matrices)

$$\prod^{S_{m_p(i)}}(k) = 1 + \mathrm{mod}(k + m_p(i) - 1, d), \tag{6}$$

$$k = 1, 2, \ldots, d.$$

$$\prod^{S_{n_p(i)}}(k) = 1 + \mathrm{mod}(k + n_p(i) - 1, d), \tag{7}$$

$$k = 1, 2, \ldots, d.$$

Using the fact that the matrix equation B=CAD* can be reshaped into the vector equation vec(B)=(D⊗C)vec(A), we rewrite (3) to express $\underline{u} \in \mathbb{R}^{d^2}$ in terms of $\{\underline{f}_i\}_{i=1}^{p^2} \in \mathbb{R}^{r^2q^2}$ as follows.

$$\underline{u} = \sum_{i=1}^{p^2} \left( (S_{n_p(i)} Z_p) \otimes (S_{m_p(i)} Z_p) \right) \underline{f}_i. \tag{8}$$

By the mixed-product property of the Kronecker product, we have $$(S_{n_p(i)} Z_p) \otimes (S_{m_p(i)} Z_p) = (S_{n_p(i)} \otimes S_{m_p(i)})(Z_p \otimes Z_p). \tag{9}$$

Let $$S_{p^2}^i \triangleq S_{n_p(i)} \otimes S_{m_p(i)}, \tag{10}$$

and $$Z_{p^2} \triangleq Z_p \otimes Z_p. \tag{11}$$

$S_{p^2}^i \in \mathbb{R}^{d^2 \times d^2}$ therefore represents 2D (circular) shifting, by $m_p(i)$ rows down, and by $n_p(i)$ columns to the right, and $Z_{p^2} \in \mathbb{R}^{d^2 \times r^2q^2}$ represents 2D zero-filling by a factor of p. Note that $S_{p^2}^i$ is a permutation matrix, since the Kronecker product of two permutation matrices ($S_{m_p(i)}$ and $S_{n_p(i)}$) is a permutation matrix.

Using (8)-(11), we have $$\underline{u} = \sum_{i=1}^{p^2} S_{p^2}^i Z_{p^2} \underline{f}_i. \tag{12}$$

Note that (12) is the vector equation form of the matrix equation (3).

Now, assume we have available a LR (primary) dictionary, $\Psi \in \mathbb{R}^{r^2q^2 \times M}$, with M linearly independent atoms as its columns, and that $\Psi$ spans the set of PPPCs, $\{\underline{f}_i\}_{i=1}^{p^2}$ and let $\{\underline{\alpha}_i\}_{i=1}^{p^2} \in \mathbb{R}^M$ denote the corresponding representations in terms of $\Psi$, i.e., $$\underline{f}_i = \Psi \underline{\alpha}_i \text{ for } i=1, 2, \ldots, p^2. \tag{13}$$

Equation (12) can therefore be rewritten as $$\underline{u} = \sum_{i=1}^{p^2} S_{p^2}^i Z_{p^2} \Psi \underline{\alpha}_i. \tag{14}$$

Rewriting (14) in matrix-vector form, we get $$\underline{u} = \begin{bmatrix} S_{p^2}^1 Z_{p^2} \Psi & S_{p^2}^2 Z_{p^2} \Psi & \ldots & S_{p^2}^{p^2} Z_{p^2} \Psi \end{bmatrix} \begin{bmatrix} \underline{\alpha}_1 \\ \underline{\alpha}_2 \\ \vdots \\ \underline{\alpha}_{p^2} \end{bmatrix}. \tag{15}$$

Or more concisely, $$\underline{u} = V\underline{\alpha}, \tag{16}$$

with $$V \triangleq \begin{bmatrix} S_{p^2}^1 Z_{p^2} \Psi & S_{p^2}^2 Z_{p^2} \Psi & \ldots & S_{p^2}^{p^2} Z_{p^2} \Psi \end{bmatrix}, \tag{17}$$

and $$\underline{\alpha} \triangleq \begin{bmatrix} \underline{\alpha}_1 \\ \underline{\alpha}_2 \\ \vdots \\ \underline{\alpha}_{p^2} \end{bmatrix}. \tag{18}$$

Thus, the matrix $V \in \mathbb{R}^{d^2 \times p^2 M}$ is the answer to the question we posed at the beginning of this section. In particular, if we pick any vector $\underline{\alpha} \in \mathbb{R}^{p^2 M}$, then $\underline{u} = V\underline{\alpha}$ is a HR image with $p^2$ PPPCs that correspond to $p^2$ linear combinations $\{\underline{\alpha}_i\}_{i=1}^{p^2}$ of the M atoms of $\Psi$, where the coefficients of the linear combinations are stored in $\underline{\alpha}$.

In other words, if we let $\mathcal{V}$ denote the subspace of all HR images of dimension $d^2$ whose PPPCs are in span($\Psi$), then $$\mathcal{V} = \mathrm{span}(V). \tag{19}$$

Equation (17) gives us two options as to how to construct V. The first (needlessly computationally expensive) option is to construct the matrices, $\{S_{p^2}^i\}_{i=1}^{p^2}$ and $Z_{p^2}$ (using equations (4), (6), (7), (10) and equations (5), (11), respectively) and then perform $p^2$ multiplications with $\Psi$.

The second option is to simply perform the operations of zero-filling and shifting on the atoms of $\Psi$, without actually using any matrix operators. In other words, V can be constructed from $\Psi$ without using a single floating point arithmetic. For example, the following Matlab code constructs V from $\Psi$ without any calculations

TABLE 1

Matlab code to construct V from $\Psi$

```
% input: Psi (and r,p,q,M)
d = r*p*q;
Psi_vec2mat = reshape(Psi,r*q,r*q,M);
V = zeros(d*d,p*p*M);
zrs = zeros(d,d,M);
c = 0;
for i = 1:p
    for j = 1:p
        c = c+1;
        atomZshift = zrs;
        atomZshift(i:p:end,j:p:end,:) = Psi_vec2mat;
        V(:, (c−1)*M+1:c*M) = reshape(atomZshift,d*d,M);
    end
end
% output: V
```

However, besides allowing for a formal description of V, the matrices $\{S_{p^2}^i\}_{i=1}^{p^2}$ and $Z_{p^2}$ pave the way for useful insights. To elaborate, note first that V can be factored as the product of two matrices as follows.

$$V = [S_{p^2}^1 Z_{p^2}\ S_{p^2}^2 Z_{p^2}\ \ldots\ S_{p^2}^{p^2} Z_{p^2}](\oplus_{i=1}^{p^2} \Psi). \tag{20}$$

If we define $$P \triangleq [S_{p^2}^1 Z_{p^2}\ S_{p^2}^2 Z_{p^2}\ \ldots\ S_{p^2}^{p^2} Z_{p^2}], \tag{21}$$

and $$V_\Psi \triangleq \oplus_{i=1}^{p^2} \Psi, \tag{22}$$

then $$V = P V_\Psi. \tag{23}$$

Now, instead of wastefully computing the Kronecker product in (11), it can be verified (using the code (5) and equation (11)) that $Z_{p^2}$ is a binary matrix with the following code $$\prod_{d^2}^{Z_p^2}(k) = 1 + p\left(\left\lceil\frac{k}{rq}\right\rceil - 1\right)d + \bmod(k-1, rq)\right), \tag{24}$$

$k = 1, 2, \ldots, r^2 q^2$.

Similarly, the row-indices encoding the i-th (permutation) matrix, $S_{p^2}^i$, are $$\prod_{p^2}^{S^i}(k) = 1 + \bmod\left(\bmod(n_p(i)d + m_p(i) + k - 1, d^2), d\right) + \tag{25}$$

$$\bmod\left(d\left(\left\lceil\frac{k-1}{d}\right\rceil + n_p(i)\right), d^2\right),$$

$k = 1, 2, \ldots, d^2$

Now, let's turn our attention to the matrix $P \in \mathbb{R}^{d^2 \times d^2}$, defined in (21). P consists of $p^2$ blocks, $\{S_{p^2}^i Z_{p^2}\}_{i=1}^{p^2}$, and can be encoded given (24) and (25). In particular, knowing the fact that a zero-filling (or 'upsampling') matrix acts as a 'decimation' matrix when we post-multiply with it, then all post-multiplying $S_{p^2}^i$ with $Z_{p^2}$ does is simply knock out $(p^2-1)r^2 q^2$ columns of $S_{p^2}^i$. Said differently, $Z_{p^2}$, conveniently represented by its code (24), tells us which (of the remaining $r^2 q^2$) columns of $S_{p^2}^i$ are stored as the i-th block in P. Using all these facts together, one can deduce the following encoding of P.

$$\prod^P(k) = 1 + \bmod\left(\bmod(n_p(\bar{\bar{i}})d + m_p(\bar{\bar{i}}) + \bar{k} - 1, d^2), d\right) + \tag{26}$$

$$\bmod\left(d\left(\left\lceil\frac{\bar{k}-1}{d}\right\rceil + n_p(\bar{\bar{i}})\right), d^2\right),$$

$\bar{k} = \bmod(\ell - 1, d^2) + 1,$ $\bar{\bar{i}} = \left\lceil\frac{\ell}{d^2}\right\rceil,$ $\ell = 1 + p\left(\left(\left\lceil\frac{\bar{\bar{k}}}{rq}\right\rceil - 1\right)d + \bmod(\bar{\bar{k}} - 1, rq)\right) + \left(\left\lceil\frac{k}{r^2 q^2}\right\rceil - 1\right)d^2,$ $\bar{\bar{k}} = \bmod(k - 1, r^2 q^2) + 1$ $k = 1, 2, \ldots, d^2$ where $m_p$ and $n_p$ are defined in (4).

Equations (22), (23) and (26) offer an alternate formal and efficient description of how to construct V (in lieu of the computationally expensive option of using equations (4)-(7), (10), (11)). In particular, note that $V_\Psi$ (defined in (22)) is just a matrix that contains $p^2$ replicas of $\Psi$ on its diagonal (no calculations are required to construct $V_\Psi$). Additionally, it can be proven that P is a permutation matrix and therefore V can be constructed simply by shuffling the rows of $V_\Psi$ according to $\pi^P(k)$.

By definition, each column and each row in a permutation matrix must have a single "1" element. In other words, if one can verify that the row-indices $\pi^P(k)$ are all unique (no repetitions), then P is a permutation matrix. An easier approach to show that P is a permutation matrix, is to use the fact that a matrix A is a permutation matrix iff A is square, binary and orthogonal (A*A=I). Now, since P is square and binary, proving that P*P=I proves that P is a permutation matrix. In other words, in light of the block structure of P, we just need to show that $$(S_{p^2}^i Z_{p^2})^* S_{p^2}^j Z_{p^2} = \begin{cases} I, & i = j \\ O, & i \neq j \end{cases} \tag{27}$$

The first part is trivial. In particular, $S_{p^2}^i$ is a permutation matrix, and therefore its columns are orthonormal. Obviously, deleting columns (by post-multiplying with $Z_{p^2}$), does not change the fact that the remaining columns are still orthonormal, i.e. $(S_{p^2}^i Z_{p^2})^* S_{p^2}^i Z_{p^2} = I$.

As to the second part, recall that the function of zero-filling and shifting is to perform interlacing of PPCs using the sum in (12), which means that the non-zero elements of zero-filled and shifted PPCs cannot overlap. This implies that $$(S_{p^2}^i Z_{p^2} \underline{f_i}) \odot (S_{p^2}^j Z_{p^2} \underline{f_j}) = \underline{0} \Rightarrow (S_{p^2}^i Z_{p^2} \underline{f_i})^* S_{p^2}^j Z_{p^2} \underline{f_j} = 0, \tag{28}$$

i.e. $\underline{f_i}^* (Z_{p^2}^* S_{p^2}^{i*} S_{p^2}^j Z_{p^2}) \underline{f_j} = 0$. Now consider the special case where $\underline{f_i} = \underline{f_j} = \underline{1}$ for some $i \neq j$, where $\underline{1}$ is an all-one vector. In this case, we have $\underline{1}^*(Z_{p^2}^* S_{p^2}^{i*} S_{p^2}^j Z_{p^2}) \underline{1} = 0$, i.e. the sum of all elements of the matrix $T = Z_{p^2}^* S_{p^2}^{i*} S_{p^2}^j Z_{p^2}$ must be zero, so what does that tell us about T? We know that the product of two permutation matrices is a permutation matrix and therefore $S_{p^2}^{i*} S_{p^2}^j$ is a permutation matrix. Also, post-multiplying by $Z_{p^2}$ and pre-multiplying by $Z_{p^2}^*$ only deletes columns and rows, respectively. In particular, the product $(S_{p^2}^{i*}S_{p^2}^{j})Z_{p^2}$ removes $(p^2-1)r^2q^2$ columns of the permutation matrix $S_{p^2}^{i*}S_{p^2}^{j}$, which means that $(S_{p^2}^{i*}S_{p^2}^{j})Z_{p^2}$ has only $r^2q^2$ binary rows, each of which containing a single "1", with the remaining $(p^2-1)r^2q^2$ rows being entirely zero-row vectors. Now, if we delete $(p^2-1)r^2q^2$ rows of $S_{p^2}^{i*}S_{p^2}^{j}Z_{p^2}$, by pre-multiplying with $Z_{p^2}^*$, we get T, and thus T can be either a binary matrix or an all zero matrix, depending on which rows are deleted from $S_{p^2}^{i*}S_{p^2}^{j}Z_{p^2}$ to get T. However, since the sum of all elements of T must be zero, then T cannot be a binary matrix, which leaves us with only one possibility, i.e. $Z_{p^2}^*S_{p^2}^{i*}S_{p^2}^{j}Z_{p^2}=O$.

2. The Intersection Subspace of a Pair of HR Subspaces Based on a Pair of LR Dictionaries Let $\{\underline{g}_i\}_{i=1}^{q^2} \in \mathbb{R}^{r^2p^2}$ denote the set of all $q^2$ SPPCs of the HR image $\underline{u}$ (corresponding to the secondary decimation factor q), and assume we have available a (secondary) LR dictionary, $\Phi \in \mathbb{R}^{r^2p^2 \times N}$, with N linearly independent atoms as its columns, and that $\Phi$ spans the set of SPPCs, i.e.

$$\underline{g}_i = \Phi \underline{\beta}_i \text{ for } i=1, 2, \ldots, q^2, \quad (29)$$

where $\{\underline{\beta}_i\}_{i=1}^{q^2} \in \mathbb{R}^N$ denote the corresponding representations of $\{\underline{g}_i\}_{i=1}^{q^2}$ in terms of $\Phi$.

Also, let $\mathcal{W}$ denote the subspace of all HR images of dimension $d^2$ whose SPPCs are in span($\Phi$), and let $W \in \mathbb{R}^{d^2 \times q^2 N}$ be the basis matrix of $\mathcal{W}$, i.e.

$$\mathcal{W} = \text{span}(W). \quad (30)$$

Following the analysis presented in the previous section, we can construct W from $\Phi$, simply by exchanging p and q. In particular, the following equations define W.

$$W = QW_\Phi, \quad (31)$$

where $$W_\Phi = \oplus_{i=1}^{q^2} \Phi, \quad (32)$$

and $Q \in \mathbb{R}^{d^2 \times d^2}$ is a permutation matrix with row-indices given by $$\prod{}^Q(k) = 1 + \text{mod}\left(\text{mod}(n_q(\overline{i})d + m_q(\overline{i}) + \overline{k} - 1, d^2), d\right) + \quad (33)$$
$$\text{mod}\left(d\left(\left\lceil\frac{\overline{k}-1}{d}\right\rceil + n_q(\overline{i})\right), d^2\right),$$

$$\overline{k} = \text{mod}(\ell - 1, d^2) + 1,$$

$$\overline{i} = \left\lceil\frac{\ell}{d^2}\right\rceil,$$

$$\ell = 1 + q\left(\left(\left\lceil\frac{\overline{k}}{rp}\right\rceil - 1\right)d + \text{mod}(\overline{k} - 1, rp)\right) + \left(\left\lceil\frac{k}{r^2p^2}\right\rceil - 1\right)d^2,$$

$$\overline{\overline{k}} = \text{mod}(k-1, r^2p^2) + 1$$

$$k = 1, 2, \ldots, d^2$$

where $$m_q(\overline{i}) = \left\lceil\frac{\overline{i}}{q}\right\rceil - 1, \quad (34)$$

$$n_q(\overline{i}) = \text{mod}(\overline{i} - 1, q).$$

Now, similarly to (16), the HR image can be expressed as $$\underline{u} = W\underline{\beta}, \quad (35)$$

where $$\underline{\beta} \triangleq \begin{bmatrix} \underline{\beta}_1 \\ \underline{\beta}_2 \\ \vdots \\ \underline{\beta}_{q^2} \end{bmatrix}. \quad (36)$$

Now we are ready to ask the following question: Could it be possible that V and W are all we need to find $\underline{u}$? If the answer is yes, then, effectively, the pair of LR dictionaries $\Psi$ and $\Phi$ are all that is required to find the HR image.

To answer that question, we begin by first combining equations (16) and (35) into one equation $$V\underline{\alpha} = W\underline{\beta}, \quad (37)$$

which we rewrite as $$[V \ W]\begin{bmatrix} \underline{\alpha} \\ -\underline{\beta} \end{bmatrix} = \underline{O}. \quad (38)$$

Equation (38) suggests that we need to study the nullspace of the augmented matrix $[V \ W] \in \mathbb{R}^{d^2 \times (p^2M + q^2N)}$. Before we explain, let $\mathcal{Z}$ denote the nullspace of $[V \ W]$, and let $Z \in \mathbb{R}^{(p^2M + q^2N) \times z}$ be its basis, where $z \triangleq \dim(\mathcal{Z})$, i.e.

$$Z \triangleq \text{null}([V \ W]), \quad (39)$$

and $$\mathcal{Z} = \text{span}(Z), \quad (40)$$

and assume that the sought after HR image is large enough. Specifically, assume $$d^2 = r^2p^2q^2 \geq (p^2M + q^2N). \quad (41)$$

Now, define $$\mathcal{U} \triangleq \mathcal{V} \cap \mathcal{W}, \quad (42)$$

and let U denote the basis for the intersection subspace $\mathcal{U}$, i.e.

$$\mathcal{U} = \text{span}(U). \quad (43)$$

Since $\underline{u} \in \mathcal{V}$ and $\underline{u} \in \mathcal{W}$, then $\underline{u} \in \mathcal{U}$, which means that if $\dim(\mathcal{U}) = 1$, then finding U is tantamount to finding (a scaled version of) $\underline{u}$. However, thus far, all we know about the dimensionality of the intersection subspace is $$1 \leq \dim(\mathcal{U}) \leq \min(p^2M, q^2N), \quad (44)$$

where the lower bound is due to the fact that $\underline{u} \in \mathcal{U}$, while the upper bound is due to (42).

To gain additional insight, we need to turn our attention to the nullspace. In particular, let Z be partitioned into a column of two matrices, $Z_V \in \mathbb{R}^{p^2M \times z}$ and $Z_W \in \mathbb{R}^{q^2N \times z}$, i.e.

$$Z = [Z_W^{Z_V}], \quad (45)$$

then $$U = VZ_V, \quad (46)$$

Equivalently, $$U = WZ_W. \quad (47)$$

Therefore, if V has full rank $p^2M$, or, equivalently, W has full rank $q^2N$, then, $$z \triangleq \dim(\mathcal{Z}) = \text{rank}(Z) = \text{rank}(Z_V) = \text{rank}(Z_W) = \text{rank}(U) = \dim(\mathcal{U}). \quad (48)$$

To verify that V is full rank, recall equations (22), (23) and that P*P=I, hence $$V^*V = \oplus_{i=1}^{p^2}(\Psi^*\Psi).\qquad(49)$$

Therefore, rank(V)=rank(V*V)=$p^2$rank($\Psi^*\Psi$)=$p^2$rank($\Psi$)=$p^2$M. Similarly, $$W^*W = \oplus_{i=1}^{q^2}(\Phi^*\Phi),\qquad(50)$$

and thus rank(W)=$q^2$N.

Now equation (48) says that the dimensionality of the intersection subspace is equal to the nullity of the augmented matrix [V W]. Of course, the nullity of a matrix is simply the multiplicity of its zero singular values, so the question (which we posed before equation (37)) boils down to: what are the necessary and sufficient conditions for [V W] to have no more than 1 zero-singular value?

The first three necessary conditions are obvious and are already satisfied. Namely, we obviously need the augmented matrix to have more rows than columns (41). Also, the columns of V must be linearly independent (rank(V)=$p^2$M). Similarly, the columns of W must be linearly independent as well (rank(W)=$q^2$N).

The fourth necessary condition is also obvious and it pertains to the span of each of the pair of LR dictionaries $\Psi$ and $\Phi$. In particular, let $\{\underline{\tilde{f}}_i\}_{i=1}^{p^2}$ and $\{\underline{\tilde{g}}_i\}_{i=1}^{q^2}$ denote the two sets of PPPCs and SPPCs, respectively, of a different HR image $\underline{\tilde{u}} \neq c\underline{u}$, $c \in \mathbb{R}$ (namely, $\underline{\tilde{u}}$ is a different image and it is not simply a scaled version of $\underline{u}$). If $\{\underline{\tilde{f}}_i\}_{i=1}^{p^2} \in \text{span}(\Psi)$, then we know that $\underline{\tilde{u}} \in \mathcal{V}$. If, additionally, $\{\underline{\tilde{g}}_i\}_{i=1}^{p^2} \in \text{span}(\Phi)$, then $\underline{\tilde{u}} \in \mathcal{W}$, and therefore $\underline{\tilde{u}} \in \mathcal{U}$. But we already know that $\underline{u} \in \mathcal{U}$, and therefore, in this case, dim($\mathcal{U}$)$\geq$2. In other words, the fourth necessary condition necessitates that the pair of LR dictionaries cannot, simultaneously, accommodate the PPCs of any HR image other than $\underline{u}$.

Are there any more conditions? Ostensibly, the answer would require the daunting task of examining the very sparse structure of both V and W; particularly the interaction of both sparse structures within the augmented matrix [V W]. Instead, we derive equivalent forms of (38) to see if the associated matrices are more revealing.

We proceed with the pre-multiplication of both sides of (38) with [V W]*, to obtain $$\begin{bmatrix} V^*V & V^*W \\ W^*V & W^*W \end{bmatrix}\begin{bmatrix} \underline{\alpha} \\ -\underline{\beta} \end{bmatrix} = \underline{0}.\qquad(51)$$

For convenience, and without loss of generality, we assume that atoms of a LR dictionary are orthonormal, i.e.

$$\Psi^*\Psi = I,\qquad(52)$$

and $$\Phi^*\Phi = I.\qquad(53)$$

Using (49) and (52) we get $$V^*V = I,\qquad(54)$$

Similarly (50), (53), $$W^*W = I.\qquad(55)$$

Consequently, equation (51) is rewritten as $$\begin{bmatrix} I & V^*W \\ W^*V & I \end{bmatrix}\begin{bmatrix} \underline{\alpha} \\ -\underline{\beta} \end{bmatrix} = \underline{0}.\qquad(56)$$

Now the top part of (56) gives us the equation $$\underline{\alpha} = V^*W\underline{\beta},\qquad(57)$$

and the bottom part reveals that $$\underline{\beta} = W^*V\underline{\alpha}.\qquad(58)$$

Plugging (58) in (57), we get $$(I - V^*WW^*V)\underline{\alpha} = \underline{0}.\qquad(59)$$

Note that $V^*WW^*V = (W^*V)^*W^*V$, and therefore, $V^*WW^*V$ is a symmetric positive semidefinite (PSD) matrix with singular values between 0 and 1 (the upper limit on the largest singular value is due to (54) and (55)). Likewise, the matrix $(I-V^*WW^*V)$ is also symmetric, PSD, with singular values between 0 and 1. Moreover, since (59) is derived from (51), which in turn is derived from (38), then $Z_V = \text{null}(I-V^*WW^*V)$. In other words, dim($\mathcal{U}$) is equal to the multiplicity of the smallest ("0") singular value of $(I-V^*WW^*V)$. Equivalently, dim($\mathcal{U}$) is equal to the multiplicity of largest ("1") singular value of $V^*WW^*V$, which is the same multiplicity of the largest singular value of $W^*V$, i.e.

$$\dim(\mathcal{U}) = \text{multiplicity of } \sigma_1(W^*V),\qquad(60)$$

where $\sigma_1(.)$ denotes the largest singular value of a matrix.

So let's take a look at the structure of $W^*V$ and see if it could reveal anything about the multiplicity of its singular values (particularly, the largest one). Given equations (22), (23) and equations (31), (32) we can write $$W^*V = (\oplus_{j=1}^{q^2}\Phi^*)Q^*P(\oplus_{i=1}^{p^2}\Psi).\qquad(61)$$

If we only consider the product $(\oplus_{j=1}^{q^2}\Phi^*)(\oplus_{i=1}^{p^2}\Psi)$, then it can be proven (with relative ease) that GCD(p,q)=1 is a necessary condition for the largest singular value to be distinct. Unfortunately, the presence of the permutation matrix $Q^*P$ in the middle between $(\oplus_{j=1}^{q^2}\Phi^*)$ and $(\oplus_{i=1}^{p^2}\Psi)$ complicates the picture. Yet, the same necessary condition can still be observed to hold for $\sigma_1(W^*V)$ to be distinct.

For practical reasons that shall become apparent later, we are only interested in the case q=p+1, which automatically satisfies GCD(p,q)=1. Said differently, we are only interested in what the structure of $W^*V$ can reveal about the multiplicity of $\sigma_1(W^*V)$ given the assumption (1). Before we proceed, let us first make the following definitions.

Let $A_j^i \in \mathbb{R}^{r^2 \times M}$ and $B_j^i \in \mathbb{R}^{r^2 \times N}$ denote submatrices of $\Psi$, and $\Phi$, respectively, such that $$A_j^i = D_{q^2}R_{k_q(i),k_q(j)}\Psi,\qquad(62)$$

where $D_{q^2} \in \mathbb{R}^{r^2 \times r^2q^2}$ represents 2D decimation by a factor of q, and $R_{k_q(i),k_q(j)} \in \mathbb{R}^{r^2q^2 \times r^2q^2}$ represents 2D shifting by $k_q(i)$ rows up, and $k_q(j)$ columns to the left, where $$k_q(i) = \text{mod}(q-i,q).\qquad(63)$$

Said differently, if we obtain the 2D form of each atom (column) in $\Psi$, and decimate (by q) each (2D) atom starting at the entry located in column $k_q(j)+1$ and row $k_q(i)+1$, and then vectorize the decimated atoms and stack them next to each other, we get $A_j^i$.

Similarly, $$B_j^i = D_{p^2}R_{k_p(i),k_p(j)}\Phi,\qquad(64)$$

where $D_{p^2} \in \mathbb{R}^{r^2 \times r^2p^2}$ represents 2D decimation by a factor of p, and $R_{k_p(i),k_p(j)} \in \mathbb{R}^{r^2p^2 \times r^2p^2}$ represents 2D shifting by $k_p(i)$ rows up, and $k_p(j)$ columns to the left, where $$k_p(i) = \text{mod}(p-i,p).\qquad(65)$$

Now, it can be verified that when (1) is satisfied, $W^*V \in \mathbb{R}^{q^2N \times p^2M}$ is a dense $q \times p$ block-Toeplitz matrix, i.e.

$$W^*V = \begin{bmatrix} T_0 & T_{-1} & T_{-2} & \cdots & T_{1-p} \\ T_1 & T_0 & T_{-1} & \cdots & T_{2-p} \\ T_2 & T_1 & T_0 & \cdots & T_{3-p} \\ \vdots & \vdots & \vdots & \ddots & \vdots \\ T_{q-1} & T_{q-2} & T_{q-3} & \cdots & T_0 \end{bmatrix}, \quad (66)$$

with each block $T_i \in \mathbb{R}^{qN \times pM}$, $1-p \leq i \leq q-1$, being a $q \times p$ block-Toeplitz matrix itself, $$T_i = \begin{bmatrix} C_0^i & C_{-1}^i & C_{-2}^i & \cdots & C_{1-p}^i \\ C_1^i & C_0^i & C_{-1}^i & \cdots & C_{2-p}^i \\ C_2^i & C_1^i & C_0^i & \cdots & C_{3-p}^i \\ \vdots & \vdots & \vdots & \ddots & \vdots \\ C_{q-1}^i & C_{q-2}^i & C_{q-3}^i & \cdots & C_0^i \end{bmatrix}, \quad (67)$$

where the j-th sub-block $C_j^i \in \mathbb{R}^{N \times M}$, $1-p \leq j \leq q-1$, is given by $$C_j^i = B_j^{i*} A_j^i, \quad (68)$$

and $A_j^i$ and $B_j^i$ are as defined in (62)-(65).

In other words, when (1) is satisfied it can be verified that $W^*V$ is a Toeplitz-block-Toeplitz (a 2-level Toeplitz) matrix generated by the $(p+q-1)^2 = 4p^2$ sub-blocks $$\{C_j^i\}_{i,j=1-p}^{q-1}$$

as detailed by equations (62)-(68). Moreover, equations (62)-(65), and (68) tell us that all these sub-blocks are unique (i.e. $C_j^i \neq C_{\bar{j}}^{\bar{i}}$ if either $\bar{i} \neq i$ or $\bar{j} \neq j$).

So now, instead of wondering about other conditions we might need for the (sparse) augmented matrix of (38) to have a nullity of exactly 1, the question becomes: given that $q=p+1$, are the aforementioned necessary conditions all we need for the (dense) Toeplitz-block-Toeplitz matrix $W^*V$ to have a distinct largest singular value?

The relevant literature is rich with analysis and properties pertaining to Toeplitz matrices. However, to the best of our knowledge, when it comes to the question of the multiplicity of singular values of Toeplitz-structured matrices, the answer can only be given in the context of asymptotic distributions of singular values (and under assumptions that do not apply in our case). Therefore, we state the following empirically verifiable result.

Empirical Result 1: Given that the basic assumption (1) is satisfied, i.e. $q=p+1$, the following conditions are both necessary and sufficient for $\sigma_1(W^*V)$ to be distinct.

1—

$$r \geq \left\lceil \frac{\sqrt{(p^2M + q^2N)}}{pq} \right\rceil.$$

This is a reformulation of (41) in light of the fact that r must be an integer.

2—rank($\Psi$)=M (the atoms of $\Psi$ must be linearly independent for columns of V to be linearly independent).

3—rank($\Phi$)=N (the atoms of $\Phi$ must be linearly independent for columns of W to be linearly independent).

4—At most, the pair ($\Psi,\Phi$) simultaneously accommodate the PPCs of only one image.

Note that if the pair ($\Psi,\Phi$) simultaneously accommodate the PPCs of exactly one image, then $\sigma_1(W^*V)=1$, and, equivalently, dim($\mathcal{U}$)=1.

3. The Need for an Arbitrator

In the previous two sections, we have seen that the intersection subspace of two HR subspaces based on two (different-resolution) LR dictionaries is at most 1-dimensional (if the four conditions listed above are satisfied). Relying on this knowledge, we now turn our attention to finding the HR image.

As is well-known if dim($\mathcal{U}$)=1, the easiest (and most computationally efficient) way to find a solution to (37) is to simply compute the right singular vector associated with the smallest ("0") singular value of [V W]. Similarly, when (52) and (53) are satisfied, the solution to the alternative formulation (59) is the singular vector of $(I-V^*WW^*V)$ associated with its smallest ("0") singular value, which is also the right singular vector associated with the largest ("1") singular value of $W^*V$.

In practice, however, the pair of LR dictionaries are 'learned' from training (example) LR images and thus they would never simultaneously exactly accommodate the PPCs of the sought after HR image $\underline{u}$ (or any other image for that matter). In other words, the intersection subspace is always empty if the conditions of Empirical Result 1 are satisfied (since, in practice, the pair of LR dictionaries do not, simultaneously, exactly accommodate the PPCs of any image).

Nevertheless, since $\sigma_1(W^*V)<1$ is distinct, the optimal (in the Frobenius norm sense) approximate solution to (59), remains the right singular vector of $W^*V$ associated with $\sigma_1(W^*V)$. Alternatively, since the smallest singular value of [V W] is distinct iff $\sigma_1(W^*V)$ is distinct, then the optimal solution of (37) remains the right singular vector of [V W] associated with its smallest singular value.

Of course, our ultimate goal of solving (37) (or its equivalent formulation (59)) is to estimate $\underline{u}$. However, an optimal solution to (37) does 'not' necessarily guarantee the optimality of the estimation of $\underline{u}$. To explain with an (extreme) example, let $\underline{u}_1$ and $\underline{u}_2$ be two images such that $$\left\| \frac{u}{\|u\|} - \frac{u_1}{\|u_1\|} \right\| \ll \left\| \frac{u}{\|u\|} - \frac{u_2}{\|u_2\|} \right\|,$$

that i.e. $\underline{u}_1$ is a much better approximation of $\underline{u}$ than is $\underline{u}_2$, and suppose that the available pair of LR dictionaries simultaneously accommodate the PPCs of $\underline{u}_2$ exactly, while the same pair of dictionaries only approximate the PPCs of $\underline{u}_1$ (albeit very well). In this case, the exact solution of (37) will lead to the inferior approximation $\underline{u}_2$.

Again, in practice, the pair of (learned) dictionaries never do simultaneously accommodate the PPCs of any image, but the previous example helps to highlight the fact that solving (37) can be completely blind to whatever constitutes an optimal estimation of $\underline{u}$. Put differently, if we are to rely entirely on (37) (to estimate the representation of the HR image in terms of the HR bases), then the learning process of the pair of LR dictionaries must be carefully designed to try to avoid picking inferior approximations of our sought after HR image.

Before we suggest an alternative to requiring a painstaking learning process of the pair of LR dictionaries, we first note that the solution to the following optimization problem $$\min_{\underline{\alpha},\underline{\beta}} \|V\underline{\alpha} - W\underline{\beta}\|^2 \quad \text{s.t.} \quad \|\underline{\alpha}\|^2 = 1 \tag{69}$$

is the same optimal solution to (59), i.e. the solution to (69) is also the right singular vector of W*V associated with $\sigma_1(W^*V)$.

Now consider the following modified optimization problem $$\min_{\underline{\alpha},\underline{\beta}} \left( \|V\underline{\alpha} - W\underline{\beta}\|^2 + \mu \left\| \frac{1}{p^2} \sum_{i=1}^{p^2} \Psi \underline{\alpha}_i - \underline{\bar{f}} \right\|^2 \right) \quad \text{s.t.} \quad \|\underline{\alpha}\|^2 = c > 0, \tag{70}$$

where $$\underline{\bar{f}} = \frac{1}{p^2} \sum_{i=1}^{p^2} \underline{f}_i,$$

the mean of the PPPCs of the HR image, is assumed to be known (for now), and μ is a control parameter. By adding the term $$\left\| \frac{1}{p^2} \sum_{i=1}^{p^2} \Psi \underline{\alpha}_i - \underline{\bar{f}} \right\|^2,$$

we require the solution to be such that the mean of the estimated PPPCs be close to $\underline{\bar{f}}$, which has the effect of solution 'arbitration' in favor of $\underline{u}$.

Of course, $\underline{\bar{f}}$ is unknown, but what we do have in practice is the LR image, whose HR version we seek, and which we denote by $\underline{x}$. Now since the (unknown) PPPCs of the (unknown) HR image would be highly correlated with $\underline{x}$, then their unknown mean, $\underline{\bar{f}}$, would also be highly correlated with $\underline{x}$. Moreover, if $\underline{x}$ is well approximated by $\Psi$, i.e. $\|\underline{x} - \Psi(\Psi^*\underline{x})\| \approx 0$, then we can use the following expression for arbitration in favor of $\underline{u}$, $$\left\| \frac{1}{p^2} \sum_{i=1}^{p^2} \Psi \underline{\alpha}_i - \Psi(\Psi^*\underline{x}) \right\|^2 = \left\| \Psi \left( \frac{1}{p^2} \sum_{i=1}^{p^2} \underline{\alpha}_i - \Psi^*\underline{x} \right) \right\|^2 =$$

$$\left\| \frac{1}{p^2} \sum_{i=1}^{p^2} \underline{\alpha}_i - \Psi^*\underline{x} \right\|^2 = \|\mathcal{J}\underline{\alpha} - \Psi^*\underline{x}\|^2, \quad \text{where } \mathcal{J} \in \mathbb{R}^{M \times p^2 M} \text{ is a } 1 \times p^2$$

block matrix, scaled by the factor $$\frac{1}{p^2},$$

with all $p^2$ blocks being equal to the identity matrix (of dimension M), $$\mathcal{J} \stackrel{\Delta}{=} \frac{1}{p^2} \underbrace{[I_M \quad I_M \quad \ldots \quad I_M]}_{p^2 \text{ blocks}}, \tag{71}$$

and therefore, $$\mathcal{J}\underline{\alpha} = \frac{1}{p^2} \sum_{i=1}^{p^2} \underline{\alpha}_i.$$

We are now ready to write a practical version of optimization problem (70)

$$\min_{\underline{\alpha},\underline{\beta}} \left( \|V\underline{\alpha} - W\underline{\beta}\|^2 + \mu \|\mathcal{J}\underline{\alpha} - \Psi^*\underline{x}\|^2 \right) \quad \text{s.t.} \quad \|\underline{\alpha}\|^2 = c > 0, \tag{72}$$

which has the closed-form solution (see the Equation Solution Section below)

$$\underline{\hat{\alpha}} = \mu[\mu \mathcal{J}^*\mathcal{J} + (1 - \sigma)I - V^*WW^*V]^{-1}(\mathcal{J}^*\Psi^*\underline{x}) \tag{73}$$

where σ is the smallest singular value of the matrix $$\begin{bmatrix} \mu \mathcal{J}^*\mathcal{J} + I - V^*WW^*V & \frac{\mu}{\|\Psi^*\underline{x}\|} \mathcal{J}^*\Psi^*\underline{x} \\ \frac{\mu}{\|\Psi^*\underline{x}\|}(\mathcal{J}^*\Psi^*\underline{x})^* & \mu \end{bmatrix} \in \mathbb{R}(p^2M + 1) \times (p^2M + 1), \tag{74}$$

and $\mathcal{J}^*\Psi^*\underline{x} \in \mathbb{R}^{p^2 M}$ is simply $p^2$ replicas of $\Psi^*\underline{x} \in \mathbb{R}^M$, scaled by $$\frac{1}{p^2}.$$

After estimating the representation of the HR image in terms of the HR basis V, all is left to get an estimate of the HR image is to use equation (16), i.e. $\underline{\hat{u}} = V\underline{\hat{\alpha}}$. However, recall (13) and (18) and partition $\underline{\hat{\alpha}}$ into $p^2$ vectors, each of length M, i.e.

$$\underline{\hat{\alpha}} = \begin{bmatrix} \underline{\hat{\alpha}}_1 \\ \underline{\hat{\alpha}}_2 \\ \vdots \\ \underline{\hat{\alpha}}_{p^2} \end{bmatrix}.$$

Therefore, $$\underline{\hat{u}} = V\underline{\hat{\alpha}} = \text{interlace}\{\Psi\underline{\hat{\alpha}}_i\}_{i=1}^{p^2}.$$

Consequently, the construction of neither V nor W is required here. Only the product W*V is needed, which can be very efficiently computed using equations (62)-(68).

It must be re-emphasized, however, that problem formulation (72) is only one possible answer to the following question: How do we find a solution to (37), that is in favor of an optimal approximation of our sought after HR image? In other words, the HR basis matrices V and W only outline a structured subspace framework within which we have complete freedom to seek an estimate of $\underline{u}$. Indeed, one can come up with a different objective function, combined with a different set of constraints (or lack thereof), in lieu of (72), but whatever optimization problem one chooses to solve, the matrices V and W will always be in the picture, one way or another.

In that sense, the structured subspace framework (37) can be seen as a conduit through which the pair of 'LR' dictionaries ($\Psi,\Phi$) can generate (an estimate of) our 'HR' image. Moreover, we shall see next that the same framework provides the foundation for training of said 'pair' of LR dictionaries from a 'single' LR sequence.

Additionally, it goes without saying that any permutations of equation (37) are exactly equivalent to equation (37). Said differently, since a linear system of equations (e.g. (37)) remains exactly the same system of equations if you simply change the ordering of its equations, then any reformulation of V and W that amounts to permuting their rows does not change the solution space for which equation (37) was set up.

4. Learning Pairs of LR Dictionaries From a Single LR Sequence: The Baseline Thus far, we have introduced the (unorthodox) notion that a pair of LR dictionaries can indeed be all we need for estimating a HR image, using the structured subspace model. Moreover, we proposed infusing an element of arbitration to the solution framework, to avoid practical difficulties that might arise with learning a pair of LR dictionaries. In this section we show how the same subspace structure can additionally be used for training pairs of LR dictionaries in the context of estimating HR images from a single LR sequence of images.

Before we proceed, we would like to highlight a notational change. Since we estimate the k-th HR frame, $\underline{u}^k$, in a sequence of K frames $\mathbb{U}=[\underline{u}^1\ \underline{u}^2\ \ldots\ \underline{u}^K]$, by estimating patches of it (patch-based processing), we will add the superscript '$kl_s$' to our symbols to indicate that they are associated with estimating the $l_s$-th HR patch, $\underline{u}^{kl_s} \in \mathbb{R}^{d^2}$, in the k-th frame $\underline{u}^k$, where d=rpq (recall (2)). Specifically, since there is more than one way to partition the same frame into patches, we end up with multiple estimates of the same frame by computing all sets of patches that correspond to all possible partitionings. Let S denote the number of ways a frame can be partitioned, with L patches per partitioning, we use the notation $$\underline{\hat{u}}^k \equiv \mathcal{P}(\{\underline{\hat{u}}^{kl_s}\}_{l_s=1}^L\}_{s=1}^S) \tag{75}$$

to indicate that the k-th HR frame is estimated by combining all SL estimated patches $\{\{\underline{\hat{u}}^{kl_s}\}_{l_s=1}^L\}_{s=1}^S$, using some combination process $\mathcal{P}$..

Now, let $\mathcal{L}$ denote a learning function (or procedure) that learns a LR dictionary (with orthonormal atoms), using a LR training sample and a training set of LR image patches. In particular, if $\underline{x}^k$ denotes the k-th LR frame in a sequence of LR frames, $\mathbb{X}=[\underline{x}^1\ \underline{x}^2\ \ldots\ \underline{x}^K]$ that correspond to (2D) decimation of the HR sequence $\mathbb{U}$ by a factor of p, i.e. $\mathbb{X}= \mathcal{D}_{p^2}\mathbb{U}$, where $\mathcal{D}_{p^2}$ represents 2D decimation by a factor of p, then the LR patch $\underline{x}^{kl_s} \in \mathbb{R}^{r^2q^2}$ (corresponding to the HR patch $\underline{u}^{kl_s}$) is used as the training sample, around which a local set of $M_{tr}$ LR patches $X^{kl_s} \in \mathbb{R}^{r^2q^2 \times M_{tr}}$ is extracted from $\mathbb{X}$. Specifically, we use the notation $$\Psi^{kl_s} \equiv \mathcal{L}(X^{kl_s},\underline{x}^{kl_s}) \tag{76}$$

to signify that the LR dictionary $\Psi^{kl_s} \in \mathbb{R}^{r^2q^2 \times M}$ (expected to approximate the PPPCs of $\underline{u}^{kl_s}$) is learned from the training set $K^{kl_s}$ and the training sample $\underline{x}^{kl_s}$, using the learning function $\mathcal{L}$. Also, the expression $$X^{kl_s} \equiv \mathcal{K}(\mathbb{X},\underline{x}^{kl_s}) \tag{77}$$

indicates that the training set of patches is extracted from $\mathbb{X}$ around $\underline{x}^{kl_s}$ using some strategy $\mathcal{K}$.

Similarly, the same learning function $\mathcal{L}$ can be used to learn the secondary dictionary $\Phi^{kl_s} \in \mathbb{R}^{r^2p^2 \times N}$ (to approximate the SPPCs of $\underline{u}^{kl_s}$) if there exists a secondary sequence of LR images $\mathbb{Y}=[\underline{y}^1\ \underline{y}^2\ \ldots\ \underline{y}^K]$, such that $\underline{y}^k=\mathcal{D}_{q^2}\underline{u}^k$ for k=1, 2, . . . , K, where $\mathcal{D}_{q^2}$ represents 2D decimation by a factor of q. Namely, $\Phi^{kl_s} \equiv \mathcal{L}(Y^{kl_s},\underline{y}^{kl_s})$, where $\underline{y}^{kl_s} \in \mathbb{R}^{r^2p^2}$ is the secondary training sample (corresponding to $\underline{u}^{kl_s}$), and $Y^{kl_s} \in \mathbb{R}^{r^2p^2 \times N_{tr}}$ is the secondary training set containing $N_{tr}$ LR patches, i.e. $Y^{kl_s} \equiv \mathcal{K}(\mathbb{Y},\underline{y}^{kl_s})$.

Following the same notational change for estimates corresponding to patches, the symbol $V^{kl_s}$ denotes the HR basis matrix constructed from $\Psi^{kl_s}$, i.e. $V^{kl_s}=P(\oplus_{i=1}^{p^2}\Psi^{kl_s})$. Similarly, $W^{kl_s}=Q(\oplus_{i=1}^{q^2}\Phi^{kl_s})$ is the secondary HR basis matrix. Now since we are going to use (72) to solve (37), we only need the construction of the product $W^{*kl_s}V^{kl_s}$, so to simplify presentation we use the following notation $$W^{*kl_s}V^{kl_s} \equiv \mathcal{C}(\Psi^{kl_s},\Phi^{kl_s}), \tag{78}$$

to indicate that the matrix product $W^{*kl_s}V^{kl_s}$ is constructed from the learned LR dictionary pair ($\Psi^{kl_s},\Phi^{kl_s}$), using equations (62)-(68).

Normally, however, an imaging system would only have one sensor, whose output is $\mathbb{X}$, with p being simply the desired upsampling factor. In other words, a secondary sequence $\mathbb{Y}$ does not exist, and, therefore, neither does $Y^{kl_s}$, nor $\underline{y}^{kl_s}$. This obstacle can nevertheless be overcome by starting the solution with an initial estimate of the HR sequence. Specifically, let $$\hat{\mathbb{U}}_{(0)} \equiv \mathcal{E}(\mathbb{X}) \tag{79}$$

denote the initial estimate of the unknown HR sequence, based on the available LR sequence $\mathbb{X}$, using some estimation process $\mathcal{E}$, then the first estimate of the secondary sequence is given by $$\mathbb{Y}_{(1)}=\mathcal{D}_{q^2}\hat{\mathbb{U}}_{(0)}, \tag{80}$$

and the first version of the secondary LR dictionary can be learned, $\Phi_{(1)}^{kl_s} \equiv \mathcal{L}(Y_{(1)}^{kl_s},\underline{y}_{(1)}^{kl_s})$, where $Y_{(1)}^{kl_s}$ and $\underline{y}_{(1)}^{kl_s}$ denote the training set of LR patches, and the training sample, respectively, extracted from $\mathbb{Y}_{(1)}$.

With both $\mathbb{X}$ and an initial guess $\hat{\mathbb{U}}_{(0)}$ of the HR sequence at hand, our structured subspace model can be used in an iterative joint estimation of the HR sequence 'and' training of secondary LR dictionaries, as follows.

For a current estimate $\hat{u}_{(t)}^{kl_s}$ of the l-th HR patch in the k-th frame, first compute (recall (73))

$$\hat{\underline{\alpha}}_{(t)}^{kl_s} = \mu[\mu \mathcal{J}^*\mathcal{J} + (1-\sigma_{(t)}^{kl_s})I - V^{*kl_s}W_{(t)}^{kl_s}W_{(t)}^{*kl_s}V^{kl_s}]^{-1}(\mathcal{J}^*\Psi^{kl_s}\underline{x}^{kl_s}), \tag{81}$$

with $\sigma_{(t)}^{kl_s}$ being the smallest singular value of (recall (74))

$$\begin{bmatrix} \mu\mathcal{J}^*\mathcal{J}+I-V^{*kl_s}W_{(t)}^{kl_s}W_{(t)}^{*kl_s}V^{kl_s} & \frac{\mu}{\|\Psi^{*kl_s}\underline{x}^{kl_s}\|}\mathcal{J}^*\Psi^{kl_s}\underline{x}^{kl_s} \\ \frac{\mu}{\|\Psi^{*kl_s}\underline{x}^{kl_s}\|}(\mathcal{J}^*\Psi^{kl_s}\underline{x}^{kl_s})^* & \mu \end{bmatrix}, \tag{82}$$

and obtain the current estimate of the HR patch via (recall (13), (16) and (18)), $$\underline{\hat{u}}_{(t)}^{kl_s} = V^{kl_s}\underline{\hat{\alpha}}_{(t)}^{kl_s} = \text{interlace}\{\Psi^{kl_s}\underline{\hat{\alpha}}_{i,(t)}^{kl_s}\}_{i=1}^{p^2} \tag{83}$$

where $W^{*kl_s}_{(t)}V^{kl_s} \equiv \mathcal{C}(\Psi^{kl_s}, \Phi^{kl_s}_{(t)})$, and $\Phi^{kl_s}_{(t)} \equiv \mathcal{L}(Y^{kl_s}_{(t)}, \underline{y}^{kl_s}_{(t)})$, with $Y^{kl_s}_{(t)}$ and $\underline{y}^{kl_s}_{(t)}$ being the training set, and training sample, respectively, extracted from the current secondary LR sequence $\mathbb{Y}_{(t)} = \mathcal{D}_{q^2}\hat{\mathbb{U}}_{(t-1)}$, where $\hat{\mathbb{U}}_{(t-1)}$ is the previous estimate of the HR sequence.

After computing all SL current estimates of patches, $$\{\{\hat{\underline{u}}^{kl_s}_{(t)}\}^L_{\ell_s=1}\}^S_{s=1},$$

corresponding to all S partitionings of the k-th frame, find the current estimate of the k-th frame, $$\hat{\underline{u}}^k_{(t)} \equiv \mathcal{P}\{\{\hat{\underline{u}}^{kl_s}_{(t)}\}^L_{\ell_s=1}\}^S_{s=1}),$$

for k =1,2, . . . , K, to get a current estimate $\hat{\mathbb{U}}_{(t)} = [\hat{\underline{u}}^1_{(t)} \hat{\underline{u}}^2_{(t)} \ldots \hat{\underline{u}}^K_{(t)}]$ of the HR sequence.

TABLE 2

Pseudo code illustrating the basic solution baseline based on the proposed structured subspace framework.

Input: A sequence $\mathbb{X}$ of K LR images, and the desired upsampling factor, p.
Compute the initial estimate $\hat{\mathbb{U}}_{(0)} \equiv \mathcal{E}(\mathbb{X})$ of the HR sequence.
For t = 1:T
  Obtain $\mathbb{Y}_{(t)} = \mathcal{D}_{q^2}\hat{\mathbb{U}}_{(t-1)}$.
  For k = 1:K
    For s = 1:S
      For $\ell_s$ = 1:L
        ➤ Learn the primary LR dictionary:
        Extract $\underline{x}^{kl_s}$.
        Extract $X^{kl_s} \equiv \mathcal{K}(\mathbb{X}, \underline{x}^{kl_s})$.
        Compute $\Psi^{kl_s} \equiv \mathcal{L}(X^{kl_s}, \underline{x}^{kl_s})$.
        (Note: $\underline{z}^{kl_s}, X^{kl_s}, \Psi^{kl_s}$ are iteration-independent).
        ➤ Learn the secondary LR dictionary:
        Extract $\underline{y}^{kl_s}_{(t)}$.
        Extract $Y^{kl_s}_{(t)} \equiv \mathcal{K}(\mathbb{Y}_{(t)}, \underline{y}^{kl_s}_{(t)})$.
        Compute $\Phi^{kl_s}_{(t)} \equiv \mathcal{L}(Y^{kl_s}_{(t)}, \underline{y}^{kl_s}_{(t)})$.
        ➤ Estimate the HR image within the structured
        subspace framework (37). We recommend (72)
        Compute $W^{*kl_s}_{(t)}V^{kl_s} \equiv \mathcal{C}(\Psi^{kl_s}, \Phi^{kl_s}_{(t)})$.
        Compute $V^{*kl_s}W^{kl_s}_{(t)}W^{*kl_s}_{(t)}V^{kl_s}$.
        Compute smallest singular value $\sigma^{kl_s}_{(t)}$ of matrix (82).
        Compute $\hat{\underline{\alpha}}^{kl_s}_{(t)}$ (81).
        Compute $\hat{\underline{u}}^{kl_s}_{(t)}$ (83).
      End
    End Compute $\hat{\underline{u}}^k_{(t)} \equiv \mathcal{P}(\{\{\hat{\underline{u}}^{kl_s}_{(t)}\}^L_{\ell_s=1}\}^S_{s=1})$.

End
  Construct $\hat{\mathbb{U}}_{(t)} = [\hat{\underline{u}}^1_{(t)} \hat{\underline{u}}^2_{(t)} \ldots \hat{\underline{u}}^K_{(t)}]$.
End
Output: $\hat{\mathbb{U}} \triangleq \hat{\mathbb{U}}_{(T)} = [\hat{\underline{u}}^1_{(T)} \hat{\underline{u}}^2_{(T)} \ldots \hat{\underline{u}}^K_{(T)}]$.

Repeat until a prescribed number of iterations, T, has been reached to get the final estimate $\hat{\mathbb{U}}$ of the HR sequence, $$\hat{\mathbb{U}} \triangleq \hat{\mathbb{U}}_{(T)} = [\underline{\text{e,cir u}}^1_{(T)} \hat{\underline{u}}^2_{(T)} \ldots \hat{\underline{u}}^K_{(T)}]. \quad (84)$$

Refer to Table 2 and FIG. 3 for a summary of the baseline.

At this point, it is worthwhile to note that, all KSL estimates, $\{\hat{\underline{u}}^{kl_s}_{(t)}\}$, $1 \le k \le K$, $1 \le s \le S$, and $1 \le l_s \le L$, needed to create the HR sequence $\hat{\mathbb{U}}_{(t)}$, are computed completely independently from each other, and hence they can all be concurrently computed. Namely, if the computing hardware allows it, it is possible to parallel-process all KSL patches at once (per iteration).

Moreover, it should be noted that the proposed baseline is the most straightforward, and least computationally expensive for implementing the structured subspace framework. However, more complex baselines can still benefit from the structured subspace framework by jointly estimating HR patches, for example. In other words, the solution baseline can be devised such that the estimation of any patch is made dependent on the estimation of other patches (e.g. neighboring patches within the same frame, or patches across multiple estimates of the same frame, or even patches across different frames). However, we do not believe that the improvement in results, if any, would justify the added complexity. Specifically, the real power of our solution lies in the unprecedented access it provides to very narrow training sets (that are extracted from a naturally highly correlated sequence of LR images).

5. A Working Solution

In the previous section we described a general baseline for iterative estimation of a HR sequence from a LR sequence, by learning pairs of LR dictionaries within a structured subspace framework. However, many details were (intentionally) left out. Specifically, which estimation process $\mathcal{E}$ are we going to use to obtain an initial guess of the HR sequence? How about the learning function $\mathcal{L}$? Regarding those local training sets, what are the specifics of their extraction $\mathcal{K}$ from a LR sequence? Which combination process $\mathcal{P}$. is going to be used to piece together all SL estimated HR patches per frame? Indeed, what are the S different possible ways to partition a frame into patches?

The discussion of such details was postponed so as to help appreciate the cornerstone role of the structured subspace model, and to emphasize the level of freedom in the design of the baseline's remaining components. Indeed, as we shall see in the experiments section, we can get impressive results despite using some of the simplest outlines for $\mathcal{E}$, $\mathcal{K}$, $\mathcal{L}$, and $\mathcal{P}$.. This, again, underscores the baseline's most valuable asset: the structured subspace model which, in effect, leverages a sequence of LR images as a very narrow training set for estimating HR images.

A. The Initial Guess (E)

For an initial estimate (79) of the HR sequence from the available LR sequence, we choose $\mathcal{E}$ to simply represent Lanczos interpolation (by a factor of p). One might try more advanced options, but besides added complexity, even advanced methods would not give appreciably better estimates compared to simple image interpolation methods (such as bicubic or Lanczos) when the LR sequence contains complex motion patterns, and the aliasing is relatively strong.

B. Partitioning a Frame

In its simplest form, patch-based processing works by dividing a frame we desire to estimate into patches (sub-regions), and then applying the proposed estimation process for each individual patch, independently from other patches. By simply putting each estimated patch in its place, we get an estimate of the HR frame (i.e. an estimate of a HR frame is obtained by 'tiling' its estimated patches).

However, multiple estimates of the same frame can be obtained by dividing the frame into overlapping patches. To elaborate, since the size of a HR patch is d×d and d=rpq, if we use an overlap of pq pixels, vertically and/or horizontally, then a HR frame can be partitioned into patches in S=r² different ways. In particular, since the location of the 'leading' patch $u^{kl_s=1}$ of the s-th partitioning determines the locations of the remaining patches (since patches are tiled next to each other, vertically and horizontally, per partitioning), we shall give a description of the location of the leading HR patch corresponding to partitioning s, as follows [2].

$$u^{kl_s=1} = u^k(v(s)pq + 1:v(s)pq + d, h(s)pq + 1:h(s)pq + d), \quad (85)$$

where $$v(s) = \left\lceil \frac{s}{r} \right\rceil - 1, \quad (86)$$

$$h(s) = \mathrm{mod}(s-1, r),$$

and $A(r_1:r_2, c_1:c_2)$ denotes the submatrix of A, from row $r_1$ to row $r_2$, and column $c_1$ to column $c_2$.

Therefore, the corresponding leading LR patch $x^{kl_3-1}$ of the k-th LR frame $x^k$ is $$x^{kl_s=1} = x^k(v(s)q+1:v(s)q+rq, h(s)q+1:h(s)q+rq). \quad (87)$$

Similarly, the corresponding leading LR patch $y_{(t)}^{kl_s=1}$ of the k-th (secondary) LR frame $y_{(t)}^k$ is $$y_{(t)}^{kl_s=1} = y_{(t)}^k(v(s)p+1:v(s)p+rp, h(s)p+1:h(s)p+rp). \quad (88)$$

C. Extracting Local Training Sets ($\mathcal{K}$)

We follow the simple procedure $\mathcal{K}$ described in [2], wherein (overlapping) LR patches are extracted from within the spatiotemporal neighborhood of the patch $\underline{x}^{kl_s}$, as follows.

Pick the $\kappa$ LR frames in $\mathbb{X}$ that are (temporally) closest to the k-th frame.

Pick the (spatial) location of the patch $\underline{x}^{kl_s}$ as the origin.

Extract, from each one of the $\kappa$ frames, $(2b+1)^2$ spatially overlapping patches, starting at the origin, and moving (vertically and horizontally, and in opposite directions) with a step of only one pixel, and for as far as b pixels from the origin.

The result is a (local) training set $X^{kl_s}$ containing $M_{tr}=\kappa(2b+1)^2$ LR patches that are extracted from within a spatiotemporal neighborhood around $\underline{x}^{kl_s}$, with temporal width of $\kappa$ frames, and vertical (horizontal) spatial width of $(2b+1)$ pixels. The following pseudocode describes $\mathcal{K}$ more explicitly.

Suppose $x^{kl_s} = x^k(r_0+1:r_0+rq, c_0+1:c_0+rq)$, then a local training set can be extracted from $\mathbb{X}$, around $x^{kl_s}$, as follows.

```
For i_k = -0.5κ + k : 0.5κ + k - 1                                  (89)
   For i_r = -b:b
      For i_c = -b:b
         A = x^{ik} (r_0 + i_r + 1 : r_0 + i_r + rq, c_0 + i_c + 1 : c_0 + i_c + rq).
         Put vec(A) as a column in X^{kl_s}
      End
   End
End
```

Similarly, $Y_{(t)}^{kl_s}$ is extracted, around $\underline{y}_{(t)}^{kl_s}$, from $\mathbb{Y}_{(t)}$, using the same exact procedure (with $N_{tr}=M_{tr}=\kappa(2b+1)^2$).

D. Learning the Dictionaries ($\mathcal{L}$)

Dictionary learning ($\mathcal{L}$) can be based on feature selection (FS), feature extraction (FE), or a combination of both. In our case, FS far outweighs FE. In particular, PPCs are highly correlated signals, so learning a dictionary that represents them well would be heavily dependent on choosing those features (LR patches) in the training set that would capture the subtle differences between the PPCs [2].

To elaborate, since the PPCs are expected to be highly correlated with $\underline{x}^{kl_s}$, we use it as a training sample for selecting the $M \ll M_{tr}$ 'best' LR patches in $X^{kl_s}$. To that end, we use best individual feature (BIF) selection based on L1 distance between $$\frac{\underline{x}^{kl_s}}{\|\underline{x}^{kl_s}\|}$$

and normalized LR patches in $X^{kl_s}$. In other words, we select a subset $X_M^{kl_s}$ with only M LR patches out of the $M_{tr}=\kappa(2b+1)^2$ LR patches in $X^{kl_s}$, where the elements in the selected subset are simply the normalized LR patches in the training set that have the smallest L1 distance from the normalized training sample.

Now, since some of our equations are based on the (simplifying) assumption that the dictionary atoms are orthonormal, all is left to do after selecting the best M LR patches is to simply orthonormalize them. This can be done, for example, using the Gram Schmidt method (QR factorization). However, we shall be using the singular value decomposition (SVD), since it keeps the door open for further dimensionality reduction if so desired. In other words, our local dictionary $\Psi^{kl_s}$ is simply the first M left singular vectors of the selected subset $X_M^{kl_s}$. If $\tilde{M} < M$ is desired, then we simply keep the first $\tilde{M}$ left singular vectors instead.

Likewise, $\Phi_{(t)}^{kl_s}$ is the first N left singular vectors of the N-element subset $Y_{N,(t)}^{kl_s}$ selected from the (normalized) training set $Y_{(t)}^{kl_s}$, using the BIF method based on the smallest L1 distance from $$\frac{\underline{y}_{(t)}^{kl_s}}{\|\underline{y}_{(t)}^{kl_s}\|}.$$

The dictionary learning process described here is simple, yet it works surprisingly well. It must be noted, however, that this simplicity of dictionary learning is afforded to us by the 'narrowness' of the training sets, which, in turn, is attributed to the 'high correlation' between images in a LR sequence and the PPCs of a HR frame (FIG. 1). Yet, without the structured subspace framework as a tool to harness the power of narrow training LR sets for estimating HR frames, we would have been confined to the imaging hardware requirement of [1], [2].

E. Combining Multiple Estimates of a HR Frame ($\mathcal{P}$.)

Given $\Psi^{kl_s}$ and $\Phi_{(t)}^{kl_s}$ (and $\underline{x}^{kl_s}$) for $1 \leq l_s \leq L$, we can estimate $\hat{\underline{u}}_{(t)}^{kl_s}$ for $1 \leq l_s \leq L$, and tile all estimated patches into the s-th estimate $\hat{\underline{u}}_{s,(t)}^k$ of the k-th HR frame. Repeating this for all s ($1 \leq s \leq S = r^2$), we get $S = r^2$ estimates $$\{\hat{\underline{u}}_{s,(t)}^k\}_{s=1}^{r^2}$$

of the k-th HR frame.

So now, what do we do with all these estimates of the same frame? One of the simplest options is to average all $r^2$ estimates. We, nevertheless, choose to follow the solution proposed in [2] to get the final (per iteration t) estimate $\hat{\underline{u}}_{(t)}^k$ of the k-th HR frame, as follows.

$$\hat{\underline{u}}_{(t)}^k = \min_{\underline{u}_{(t)}^k} \sum_{s=1}^{r^2} \sum_{w_1} \sum_{w_2} \|H\underline{u}_{(t)}^k - R_{w_1,w_2}\hat{\underline{u}}_{s,(t)}^k\|_1, \quad (90)$$

where $R_{w1,w2}$ shifts the s-th estimate by $w_1$ and $w_2$ pixels in the horizontal and vertical direction, respectively, $-(\omega-1)/2 \leq w_1, w_2 \leq (\omega-1)/2$, and H represents a blurring kernel, to be defined by the user, to counteract the softening effect of median filtering (across all $r^2$ estimates, and within a spatial window of size $\omega \times \omega$, per pixel).

F. Solution Parameters

Now we turn to the solution parameters, and start with the integer scalar r. Given that, in practice, p is the user-defined upsampling factor, and given that q=p+1 (1), then r is the only parameter left to determine the size of the HR patch (2) or, in particular, r determines how small (41) the HR patch can be. Before we continue, now is the time to address the question: why would we want to work on patches of a frame (patch-based processing), instead of upsampling an entire frame as a whole (i.e. with r being large enough to engulf the entire frame)?

The answer to this question is in [2], but we reproduce it here for convenience. First, the short version: the more 'dynamic' the LR sequence, the greater the need for patch-based processing, with particularly small patches. The longer version of the answer would require revisiting FIG. 1 to notice that the inter-correlations between the PPCs are much greater than the correlations that exist between the LR frames (of a dynamic scene) and the PPCs (of a frame). In other words, a 'training' set of LR frames would not capture well the subtle differences between the PPCs of a HR frame as a whole. Note that in addition to a basic common component the PPCs might share, these subtle differences are, ultimately, what gives us the HR frame. Working on smaller sub-regions (patches), however, allows us to harness, from the LR frames, local training sets (as described above) from which local dictionaries can be learned for estimating HR patches. In other words, the smaller the patch, the more 'local' the training sets (and the dictionaries) get.

On the other hand, larger patches (larger r) allow for the advantage of a more overdetermined (38). So to keep things simple, when the desired upscaling factor p=3, we fix the dimensionality of all LR dictionaries at $3q^2$, i.e. $M=N=3q^2$, and let r=4. For p=4, we use r=3 and $M=N=2q^2$.

Now, how large a local training set can be (recall $N_{tr}=M_{tr}=\kappa(2b+1)^2$)? Ideally, we would want to search for 'best' LR patches in as large a spatiotemporal neighborhood as possible, i.e. $\kappa$ and b both can be as large as possible. However, and even though using BIF selection based on L1 distance from a training sample is a very low complexity FS policy, with more and more LR patches to choose from, the computational cost of total FS (performed for all patches) can get quite significant if $\kappa$ and b are too large. For that reason, we pick $\kappa=30$ and b=5.

Finally, for combining multiple estimates of the same frame (90), we choose H to be a Gaussian kernel with size 5 and standard deviation of 1, and we pick $\omega=3$.

G. The Control Parameter μ

Recall that equation (81) and (82) are simply the patch-based, iteration-dependent versions of equations (73) and (74), respectively. Yet, the control parameter $\mu$ in these equations appears patch-independent as well as iteration-independent. Can this indeed be the best strategy for selecting $\mu$? To use a fixed value across all patches and throughout all iterations?

First, recall that $\mu$ determines how close to the reference LR image should the mean of the PPCs of the estimated image be. Therefore, if $\mu$ is too large, we run the risk of an estimated HR image that has PPCs that are too close to each other (a solution with some residual aliasing). On the other hand, in practice, if $\mu$ is not high enough, the end result can be too smooth, with low contrast, especially for those parts of the scene that are too dynamic (large scene changes across captured frames). In other words, instead of using the symbol $\mu$ in equations (81) and (82), we could use $\mu_{(t)}^{kl_s}$ to account for the patch and iteration dependency in selecting the control parameter.

Nevertheless, choosing the "right" value for $\mu$ is not easy. According to experiments, the range of good values can be quite large ($0.1 \leq \mu \leq 5$), and a good choice can be dependent on many factors including high spatial frequency content per patch, patch-size, and selected dictionary atom diversity. Currently, we use the following empirical formula for determining good values for $\mu$ (per-patch and per-iteration).

$$\mu_{(t)}^{kl_s} = \min\left(\max\left(\mu_0 \frac{d^2}{p^2 M + q^2 N} \frac{\gamma}{\tau}, 0.1\right), 5\right) \quad (92)$$

where $$\tau = \frac{\left\| y_{(t)}^{kl_s} ** \begin{bmatrix} 1 & -1 \\ -1 & 1 \end{bmatrix} \right\|_F^2}{r^2 p^2},$$

** denotes 2D convolution, $\|.\|_F$ is the Frobenius norm, $\mu_0$ is a user-defined scalar that is fixed across all iterations and all patches (we pick $\mu_0=20$), and $\gamma$ is a measure of the diversity of selected atoms computed as follows.

1—Find the correlation coefficient between $\underline{x}^{kl}$ and each atom in $X_M^{kl_s}$.
2—Assign a value of 1 for correlation coefficients higher than 0.99, a value of 3 for correlation coefficients between 0.95 and 0.99, and a value of 10 for correlation factors below 0.95.
3—$\gamma$ is the average of all assigned values.

No matter how good an empirical formula for selecting $\mu_{(t)}^{kl_s}$ might be, if the value for $\mu_0$ is too high for some frames (or sub-regions of a frame), we would end up with estimated HR frames that contain regions with some residual aliasing. If that is the case, we propose the following remedy.

After obtaining the final estimate $\hat{U} \triangleq \hat{U}_{(T)} = [\hat{\underline{u}}_{(T)}^1 \hat{\underline{u}}_{(T)}^2 \ldots \hat{\underline{u}}_{(T)}^K]$ of the HR sequence (we pick T=4), we start the solution over, but this time we use $\hat{U}$ as our input sequence of LR images, and we keep all the parameters the same except for $\mu$ and r. Specifically, we keep $\mu$ fixed at the low value of 0.2, and use r=7 for p=3, and r=5 for p=4. This should take care of residual aliasing. The final sequence can then be resized down to the original desired frame size (i.e. each frame can be decimated by a factor of p).

6. Results

In this section we test the proposed solution using the 'Suzie' sequence of HR frames of size 486×720 each. First, we decimate each frame by a factor of 6 (vertically and horizontally). The top row of FIG. 4 shows some of the LR frames magnified by a factor of 3 using Lanczos interpolation. Corresponding upsampling results of the proposed solution using an upsampling factor of p=3 are shown in the bottom row.

We repeat the same experiment using a decimation factor of 8, and an upsampling factor of p=4. FIG. 5 shows Lanczos-magnified LR images vs. upsampling.

If we compare both FIG. 4 and FIG. 5, it becomes immediately evident that the upsampling quality is higher for p=3 compared to p=4. Of course, this can be justified by the fact that the LR sequence of FIG. 4 is less degraded than FIG. 5 LR sequence. But why, specifically in our case, is it easier to get better results for lower upsampling factors? It all goes back to (local) LR dictionaries' ability to capture the subtle differences between PPCs. Specifically, the higher the upsampling factor needs to be, the higher the number of PPCs, and the more difficult it becomes to represent the subtle details differentiating between PPCs, especially when the scene is highly dynamic. Moreover, with larger upsampling factors, the patch size has to be larger (recall (2) and (41)), and the larger the patches the more difficult it becomes to find good example images for learning local dictionaries.

However, this gap in upsampling quality (e.g. p=4 vs. p=3) would become smaller when the LR sequence is not highly dynamic (specifically, when scene changes, across a set of captured frames, are not too large because the frame rate is sufficiently high).

7. Denoising by Upsampling: An Additional Use for the Structured Subspace Model In section 3 (The Need for an Arbitrator), we explained that solving the equation $V\underline{\alpha}=W\underline{\beta}$ is the equivalent of finding the image in span(V) and the image in span(W) that are the closest to each other, and we chose equation (72) as the 'yardstick' to measure the distance.

To reiterate, since we adopt a feature selection (FS) strategy for selecting the atoms of the primary LR dictionary $\Psi$ (from which the HR basis matrix V is constructed) and the atoms of the secondary LR dictionary $\Phi$ (from which the HR basis matrix W is constructed), we chose (72) as the distance measure to guard against picking an inferior solution.

In particular, since images with the simplest structure tend to have the smallest discrepancies, solving $V\underline{\alpha}=W\underline{\beta}$ can favor an overly smooth solution in the absence of a proper distance measure.

On the other hand, smoothing processes are known to be useful for noise removal (denoising), but the challenge is to remove the noise 'while' leaving (most of) the underlying signal intact. This leads us to the following question: rather than minimizing it, would it be useful to 'augment' this smoothing effect to solve the noise problem?

As it turns out, by making a modification on the upsampling baseline outlined in section 4 (Learning Pairs of LR Dictionaries from a single LR Sequence: The Baseline), we can harness the smoothing effect to address the noise problem. In particular, while a sequence of images might not necessarily be in need for upsampling per se, we still engage a slightly modified version of the upsampling baseline outlined in section 4 to get rid of the noise in a process we call 'denoising by upsampling', which we describe next.

A. Iterative Noise Shedding

Recall that the original purpose of the iterations in the upsampling context was to re-estimate a better version of the (missing) secondary LR sequence. In the proposed noise removal context, however, re-engaging the structured subspace framework is a goal, in and of itself, to invoke the aforementioned smoothing effect multiple times until noise is reduced to acceptable levels.

Said differently, even if the imaging system was built such that it produces two LR sequences with different resolution, if our goal is denoising, then we propose to ignore the originally available secondary sequence.

Indeed, in this embodiment, even the original (primary) LR sequence is disposed of after the first iteration. Specifically, the upsampled output of each iteration is decimated back to the same original pixel count before being fed again as the input for the next iteration. This way, a new iteration starts with a new input sequence with lower noise. Note that here, while the final output is an upsampled version of the original input, upsampling is a means to an end (noise removal).

FIG. 16 illustrates the modification on the baseline with the aim of augmenting the smoothing effect. In particular, note that in the new proposed baseline, both the primary LR sequence and the secondary LR sequence are updated with each iteration. The modification is also reflected in a pseudo-code shown in Table 3.

Please note that in the proposed 'denoising by upsampling' context, 'low-resolution (LR)' not only means low-number of pixels, but it also means 'noisy' images. Similarly, the term 'high-resolution (HR)' here simply means 'upsampled' (primarily for the purpose of noise removal).

Finally, the proposed modification for 'denoising by upsampling' is by no means the only option to engage the structured subspace model for the purpose of denoising, but we believe it to be the simplest and most straightforward.

TABLE 3

Pseudocode illustrating the proposed changes on the basic solution b aseline to achieve 'denoising by upsampling'

Orginal input: A sequence $\mathbb{X}$ of K LR (noisy) images, and the user-defined upsampling factor, p.
Define $\mathbb{X}_{(1)} \equiv \mathbb{X}$, i.e. we use the original input (noisy) sequence for the first iteration only.
for t = 1:T
    Obtain $\mathbb{X}_{(t)} = \mathcal{D}_{p^2}\hat{\mathbb{U}}_{(t-1)}$ for t > 1.
    Obtain $\mathbb{Y}_{(t)} = \mathcal{D}_{q^2}\mathcal{E}(\mathbb{X}_{(t)})$.
    For k = 1:K
        For s = 1:S
            For $\ell_s$ = 1:L
            ➤ Learn the primary LR dictionary:
            Extract $\underline{x}_{(t)}^{k\ell_s}$.
            Extract $X_{(t)}^{k\ell_s} = \mathcal{K}(\mathbb{X}_{(t)}, \underline{x}_{(t)}^{k\ell_s})$.
            Compute $\Psi_{(t)}^{k\ell_s} = \mathcal{L}(X_{(t)}^{k\ell_s}, \underline{x}_{(t)}^{k\ell_s})$.
            ➤ Learn the secondary LR dictionary:
            Extract $\underline{y}_{(t)}^{k\ell_s}$.
            Extract $Y_{(t)}^{k\ell_s} = \mathcal{K}(\mathbb{Y}_{(t)}, \underline{y}_{(t)}^{k\ell_s})$.
            Compute $\Phi_{(t)}^{k\ell_s} = \mathcal{L}(Y_{(t)}^{k\ell_s}, \underline{y}_{(t)}^{k\ell_s})$.
            ➤ Estimate the unsampled image within the structured subspace framework (37), We recommend (72)
            Compute $W_{(t)}^{*k\ell_s}W_{(t)}^{k\ell_s} = \mathcal{C}(\Phi_{(t)}^{k\ell_s}, \Psi_{(t)}^{k\ell_s})$.
            Compute $V_{(t)}^{*k\ell_s}W_{(t)}^{k\ell_s}W_{(t)}^{*k\ell_s}V_{(t)}^{k\ell_s}$.
            Compute smallest singular value $\sigma_{(t)}^{k\ell_s}$ of matrix (82).
            Compute $\hat{\underline{\alpha}}_{(t)}^{k\ell_s}$ (81).
            Compute $\hat{\underline{u}}_{(t)}^{k\ell_s}$ (83).
        End
    End Compute $\hat{\underline{u}}_{(t)}^{k} \equiv \mathcal{P}(\{\{\hat{\underline{u}}_{(t)}^{k\ell_s}\}_{\ell_s=1}^{L}\}_{s=1}^{S})$.

End
    Construct $\hat{\mathbb{U}}_{(t)} \equiv [\hat{\underline{u}}_{(t)}^{1} \hat{\underline{u}}_{(t)}^{2} \ldots \hat{\underline{u}}_{(t)}^{K}]$.
End
Output: $\hat{\mathbb{U}} \triangleq \hat{\mathbb{U}}_{(T)} = [\hat{\underline{u}}_{(T)}^{1} \hat{\underline{u}}_{(T)}^{2} \ldots \hat{\underline{u}}_{(T)}^{K}]$.

B. Notational Change

Because even the input sequence itself is updated with every iteration, starting from equation (76) onward, the only notational changes needed in the new context is to simply add the subscript (t) to $\mathbb{X}, \underline{x}^{kl_s}, X^{kl_s}, \Psi^{kl_s}$, and $V^{kl_s}$.

C. Slightly Changed Roles of Estimation Process $\mathcal{E}$ and the Control Parameter $\mu$ The original role of estimation process E was to provide—from the available (primary) LR sequence—an initial guess of the HR sequence to be then decimated to obtain a first estimate of the (missing) secondary LR sequence (see FIG. 3).

In the modified (denoising) baseline, however, we obtain updated secondary 'and' primary LR sequences to keep shedding more noise with each iteration. Therefore, the role of $\mathcal{E}$ here is nothing more than obtaining an updated secondary sequence from the (updated) input sequence. For this purpose, $\mathcal{E}$ is best kept as simple as possible. In fact, we recommend $\mathcal{E}$ to simply be a 'nearest-neighbor' interpolator.

Also, because the primary purpose here is denoising, the role of the control parameter µ is greatly simplified. In particular, choosing a fixed, low value for µ(e.g. µ=0.2) for all image patches and across all iterations should suffice. In this context, µ only guarantees that an updated estimate does not venture too far from a previous estimate.

As to all other baseline components, they retain their same exact roles as previously described in section 4 and section 5 (A Working Solution).

8. Reclaiming Detail Lost to Upsampling: A Final Special Iteration

Another use for the structured subspace model can go beyond upsampling to recovering detail lost during the process. This can be useful as one last (special) iteration to be applied to the final output of an upsampling baseline.

In particular, recall that the only condition on the desired upsampling factor p and the secondary factor q is that q>p such that GCD(p,q)=1. Therefore, as long as q is a positive integer, then p=1 (i.e. no upsampling) will always satisfy the condition GCD(p,q)=1.

With that in mind, the following question arises: what possibly can we gain by utilizing the structured subspace model without any (further) upsampling? More specifically, if we already got the final sequence of upsampled frames, $\hat{\mathbb{U}} \triangleq \hat{\mathbb{U}}_{(T)} = [\hat{\underline{u}}_{(T)}^1 \ \hat{\underline{u}}_{(T)}^2 \ \ldots \ \hat{\underline{u}}_{(T)}^K]$, is there a way to further benefit from the structured subspace model?

To avoid confusion, we shall add two dots on top of some symbols to indicate that we are engaging the structured subspace model 'without' upsampling. In particular, we shall use the symbols $\ddot{p}$ and $\ddot{q}$, with $\ddot{p}=1$ (i.e. no upsampling is desired), and $\ddot{q}=p$ (where p is the previous user-defined upsampling factor for obtaining $\hat{\mathbb{U}}$). Now we are ready to ask the same question using more precise terms.

What kind of a HR image would we be seeking by solving the following equation?

$$\ddot{V}\underline{\ddot{\alpha}} = \ddot{W}\underline{\ddot{\beta}}, \quad (93)$$

where $\ddot{V}$ is the first HR basis matrix whose columns are (the vectorized form of) images learned from the HR sequence $\hat{\mathbb{U}}$, $\ddot{W}$ is the second HR basis matrix constructed such that it spans any HR image whose PPCs are spanned by the LR dictionary $\ddot{\Phi}$ learned from the original LR sequence $\mathbb{X}$, and $\underline{\ddot{\alpha}}$ and $\underline{\ddot{\beta}}$ are the representations of the sought after HR image in terms of the basis matrices $\ddot{V}$ and $\ddot{W}$, respectively.

A. Signal vs. Artifact

Before we explain further, we use the term 'artifact' to indicate any undesired signal. For example, noise is an artifact, pixelation (due to low pixel density) is an artifact, etc. Now, since the whole point of computing the upsampled sequence $\hat{\mathbb{U}}$ is to minimize (if not completely eliminate) pixelation and/or noise artifacts, then the subspace spanned by the basis $\ddot{V}$ would be hardly inhabitable for images with such artifacts. Said differently, since $\ddot{V}$ is learned from $\hat{\mathbb{U}}$, then it is expected to be hardly conducive to constructing noisy/pixelated images. On the other hand, the subspace spanned by $\ddot{W}$ is based upon the original LR sequence $\mathbb{X}$ where all the original artifacts are present, as well as the underlying signal.

This suggests that, by properly solving equation (93), we are offered a chance to recover at least some of the signal lost during upsampling. In other words, the image we would obtain by utilizing the structured subspace model (without further upsampling) would be an enhanced version. Another way of looking at it is that while solving (37) is the equivalent of conducting a wide-scope search for a good estimate of the underlying image $\underline{u}$, solving (93) would represent an additional—much narrower—search for an even better estimate of $\underline{u}$, where the role of $\ddot{W}$ (which is extracted from $\mathbb{X}$) here is to guide the refined search for a better estimate of the HR image within $\ddot{V}$ (which is extracted from $\hat{\mathbb{U}}$).

B. Solving Equation (93)

One option we found particularly useful to solve (93) is via solving the optimization problem $$\min_{\underline{\ddot{\alpha}},\underline{\ddot{\beta}}}(\|\ddot{V}\underline{\ddot{\alpha}} - \ddot{W}\underline{\ddot{\beta}}\|^2 + \|D\ddot{V}\underline{\ddot{\alpha}} - \underline{x}\|^2 + \mu_0\|\ddot{V}\Lambda\underline{\ddot{\alpha}}\|^2), \quad (94)$$

which has the solution $$\underline{\hat{\ddot{\alpha}}} = [I + \mu_0\Lambda^2 + (D\ddot{V})^*D\ddot{V} - \ddot{V}^*\ddot{W}\ddot{W}^*\ddot{V}]^{-1}(D\ddot{V})^*_{\underline{x}}, \quad (95)$$

and therefore the enhanced estimate of the HR image (which we denote by using a 'double hat' accent) is given by $$\underline{\hat{\hat{u}}} = \ddot{V}\underline{\hat{\ddot{\alpha}}}, \quad (96)$$

where
1—The basis matrix $\ddot{V}$ is orthonormal, with columns that are the first few left singular vectors of a matrix containing (vectorized) images that are extracted from $\hat{\mathbb{U}}$.
2—The matrix $\Lambda$ is a diagonal matrix that contain the inverse of the singular values corresponding to the aforementioned left singular vectors. Therefore, the product $\ddot{V}\Lambda$ simply scales each column of $\ddot{V}$ by the inverse of the corresponding singular value (note: we observed that a more useful variation is to enter '0' for the first element on the diagonal of $\Lambda$, and divide all other diagonal elements by the first (i.e. largest) singular value).
3—The LR dictionary $\ddot{\Phi}$ is also orthonormalized using singular value decomposition (recall that this makes the HR basis matrix $\ddot{W}$ orthonormal as well).
4—The term $\|\mathcal{D}\ddot{V}\underline{\ddot{\alpha}}-\underline{x}\|^2$ in (94) makes sure that an enhanced estimate of the HR image must be such that a downsampled version of it would be close to the available (reference) LR image $\underline{x}$ ($\mathcal{D}$ denotes downsampling). Said differently, $\|\mathcal{D}\ddot{V}\underline{\ddot{\alpha}}-\underline{x}\|^2$ is simply a 'data-fitting' term.
5—Adding the term $\mu_0\|\ddot{V}\Lambda\underline{\ddot{\alpha}}\|^2$ minimizes the contribution of an atom (column) in $\ddot{V}$ in proportion to the corresponding diagonal entry in matrix $\Lambda$. This term was added because we noticed that high order left singular vectors, if their contribution to the solution is not regulated, can destabilize the solution. This is why we chose $\Lambda$ to be a diagonal matrix as described above.

The parameter $\mu_0$ simply controls how much we need this stabilization, and it is usually a small number (e.g. $1e^{-7}$ to $1e^{-5}$).

C. Patch-based Processing

All required details (including those pertaining to patch-based processing) for using a structured subspace framework in a last iteration (meant to enhance an already upsampled sequence) can be derived from the disclosure herein. In other words, one only needs to adjust for $\ddot{p}=1$ and $\ddot{q}=p$. Table 4 and FIG. 17 summarize the proposed patch-wise processing for the purpose of enhancing an already upsampled sequence.

TABLE 4

Pseudocode illustrating one last (special) iteration for enhancing the final output of an upsampling baseline.

Input 1: the upsampled sequence $\hat{\mathbb{U}}$ (to be enhanced).
Input 2: the original LR sequence $\mathbb{X}$.
For k = 1:K
  For s = 1:S
    For $\ell_s$ = 1:L
      ➤Learn the HR basis:
      Extract the HR patch $\hat{\underline{u}}^{k\ell_s}$.
      Extract local training set $U^{k\ell_s} = \mathcal{K}(\hat{\mathbb{U}}, \hat{\underline{u}}^{k\ell_s})$.
      Compute $\ddot{V}^{k\ell_s} = \mathcal{L}(\ddot{U}^{k\ell_s}, \hat{\underline{u}}^{k\ell_s})$.
      ➤Learn the LR dictionary:
      Extract LR Patch $\underline{x}^{k\ell_s}$.
      Extract $X^{k\ell_s} = \mathcal{K}(\bar{\mathbb{X}}, \underline{x}^{k\ell_s})$.
      Compute $\ddot{\Phi}^{k\ell_s} = \mathcal{L}(X^{k\ell_s}, \underline{x}^{k\ell_s})$.
      Construct $W^{k\ell_s}$ from $\ddot{\Phi}^{k\ell_s}$.
      ➤Estimate an enhanced version of $\hat{\underline{u}}^{k\ell_s}$ Compute $\hat{\underline{\ddot{a}}}^{k\ell_s}$ (apply (95) per patch).
      Compute $\hat{\underline{u}}^{k\ell_s} = \ddot{V}^{k\ell_s} \hat{\underline{\ddot{a}}}^{k\ell_s}$
    End
  End Compute $\hat{\underline{u}}^k \triangleq \mathcal{P}\left(\left\{\{\hat{\underline{u}}\}^{k\ell_s}\right\}_{\ell_s=1}^{L}\right\}_{s=1}^{S}\right)$ End
Output: $\hat{\mathbb{U}} \triangleq [\hat{\underline{u}}^1 \ \hat{\underline{u}}^2 \ \ldots \ \hat{\underline{u}}^K]$.

A few details, however, need to be revisited here.

1—The HR basis $\ddot{V}^{k l_s}$ is best learned from a narrow 3D neighborhood around the current ($kl_s$-th) patch to be enhanced. This is consistent with the notion that this additional final iteration for enhancing upon an already upsampled image is the equivalent of a narrower search for a better estimate of the HR image. For example, choosing $\kappa=3$ and $b=3$, we extract, from $\hat{\mathbb{U}}$, $\kappa(2b+1)^2=147$ atoms only, from which we pick, say, 100 atoms (that are most similar to current patch $\hat{\underline{u}}^{k l_s}$), which are then vectorized and stacked next to each other as columns of a matrix whose SVD is computed. We retain a few (e.g. 30) of the left singular vectors to be the columns of the basis matrix $\ddot{V}^{k l_s}$.

2—Since we seek to reclaim as much lost signal as possible, we choose a high number of atoms for the LR dictionary $\ddot{\Phi}^{k l_s}$. In particular, we recommend that $$N = r^2 - \left\lceil \frac{M}{p^2} \right\rceil$$

atoms, where M is the number of columns (atoms) of $\ddot{V}^{k l_s}$ and r is the user-defined parameter that determine the patch size ($d=r\ddot{p}\ddot{q}=rp$).

A Real-World Noisy Sequence

To test the 'denoising by upsampling' functionality, we downloaded a particularly noisy CT-scan sequence from TCIA (a database sponsored by the National Institutes of Health), and utilized the 'denoising by upsampling' functionality to create HR images from the CT-scan sequence. FIG. 18 compares the originally downloaded CT-scan sequence on the left-hand side of FIG. 18 with the HR image results of the 'denoising by upsampling' functionality on the right-hand side of FIG. 18. The noise reduction between the original CT-scan sequence and the HR images is stark. The HR images provide a clear and enhanced image that may be easier for medical practitioners to read and utilize.

FIG. 18 demonstrates the versatility of the structured subspace framework. The structured subspace framework provides a search method for high-quality images within a pair of subspaces constructed from a 'pair' of (different-resolution) sequences of images (that are ultimately based on a 'single' source of images).

9. Conclusion

The basic principle of learning-based image upsampling is fairly straight-forward. In general, learning-based methods use the available LR image as 'partial measurements' (of the unknown HR image) to estimate the representation of the HR image in terms of a HR dictionary learned from a training set of HR example images. While these methods certainly differ in the details, the two most important features that account for most of the variation in results are the training sets they use (generic vs. narrow-special-sets) and the learning process of the HR dictionaries.

In contrast, the work in [1], [2], uses the same learning-based upsampling principle, although for different target signals: the PPCs of the HR image, which are LR signals themselves. This shift of focus allowed the authors of [1], [2] to exploit a sequence of LR images as a source of very narrow training sets, from which highly efficient LR dictionaries can be easily learned to represent the PPCs (of sought after HR images). The major obstacle to their idea was the lack of 'partial measurements' required to find the representations of the PPCs in terms of the LR dictionaries. To overcome this obstacle, they proposed a hardware modification such that the imaging device is equipped with another (different resolution) LR sensor (and a beam splitter) to provide the much needed partial measurements for their target images (the PPCs).

Compared to [1], [2], in current work, we shift the focus back to estimating the representation of the HR image itself, and in terms of a pair of HR bases, each of which is embedding a (different resolution) LR dictionary. The end result is a structured subspace framework through which pairs of LR dictionaries are used to estimate HR images directly, thus circumventing the very restrictive hardware assumption required in [1],[2], while still benefiting from the huge advantage of harvesting narrow training sets from a LR sequence of images.

Applied Example of Working Solution

In this section, we give a visualization of the basic solution baseline whose details were laid out above in "A Working Solution". To help with understanding, it is important to keep the big picture in mind, and which we summarize as follows:

We estimate the entire HR sequence by estimating patches (pieces) of each frame.

Because we estimate each HR patch based on a pair of (local, different resolution) LR dictionaries, we need a pair of LR sequences (of different resolution) from which to extract the pair of local dictionaries (the algorithm takes in a pair of LR dictionaries, per patch, as input, and spits out an estimate of the HR patch).

The reason we need to iterate the solution is because we do NOT have the secondary (different resolution) LR sequence (we keep estimating a better version of the missing secondary LR sequence).

The initial guess ($\mathcal{E}$)

Let's first have a look at sample LR frames of an available LR sequence (we call it the primary LR sequence) in FIG. 6.

To get the first estimate of the secondary (missing) sequence $\mathbb{Y}_{(1)}$, we need to first get an initial guess of the HR sequence $\hat{\mathbb{U}}_{(0)}$. This can be done, for example, by using 2D interpolation (by a factor of p, we choose p=3 here) of each frame $x^k$ of the primary (available) LR sequence $\mathbb{X}$. Using Matlab, this can be done as follows:

for k=1:K $\hat{u}_{(0)}^k$=imresize ($x^k$, p,' lanczos3');                    (97)

end

Now, let's take a look at the sample frames of the initial estimate of the HR sequence, shown in FIG. 7. Comparing FIG. 7 to FIG. 6, it becomes clear that the initial guess of the HR frames don't look appreciably better than the available (primary) LR frames, but this shall suffice for an initial guess. Note: each frame shown in FIG. 7 is actually $p^2$ times bigger than the corresponding frame shown in FIG. 6.

First Iteration (t=1)

To obtain the first estimate of the secondary (different/lower resolution) LR sequence, we simply decimate each frame of the HR sequence by a factor of q (q=p+1=4 here). Using Matlab, this can be done using the following code:

for k=1:K $y_{(1)}^k = \hat{u}_0^k$(1:q:end, 1:q:end);                    (98)

end

Because of the size of the figures, comparing FIG. 8 to FIG. 6, it might not be easy to see that the first estimate of the secondary LR sequence is lower resolution than the primary LR sequence, so in FIG. 9, we compare bigger versions of one of the frames (frame#31) from the primary and secondary sequences. It might still not be easy to see, but careful examination reveals the resolution is different.

Partitioning a Frame

So now that we have two (different resolution) LR sequences as input, $\mathbb{X}$ and $\mathbb{Y}_{(1)}$, how do we proceed? Like (almost) everyone else, we do not estimate an entire HR frame as a whole, instead we estimate patches (pieces) of each frame, so the next question is: how do we partition a frame into patches to be estimated?

In Section 5 (A Working Solution), we provided a description of the simplest partitioning scheme (equations (85)-(88)). For a pictorial illustration, we pick frame#31 of the primary sequence $\mathbb{X}$ and display, in FIG. 10, the $S=r^2$ possible ways of partitioning the same frame (we pick r=4 here, so each primary LR patch $x^{kl_s}$ has size rq×rq=16×16).

The so-called 'leading' patch per partitioning pattern s is shown as a brightened square in FIG. 10. We use the description 'leading' patch because it simply tells us how to cut up a frame (its location defines the partitioning pattern). So a frame is estimated in patches (pieces), and there are multiple ways to cut up a frame into patches.

Now, what happens when we compute all the HR patches corresponding to all the squares (patches) shown in FIG. 10? We get $S=r^2=16$ estimates of the same HR frame.

But why don't we simply use just one partitioning pattern? There's nothing wrong with that except that getting more estimates of the same frame (by partitioning it using $S=r^2$ patterns instead of just one pattern), allows us to reduce estimation errors since different patterns would give different estimation errors and therefore having multiple estimates of the same frame allows us to reduce estimation errors. There are many different ways one could use multiple estimates of the same frame to reduce estimation errors (equation (90), for example, is only one of them), and most people simply take the mean-or the median-of all estimates.

To illustrate the benefits of having multiple estimates of the same frame, we show in FIG. 11 the $S=r^2=16$ HR estimates of frame#31 after tiling (in place) all estimated HR patches $\{\hat{u}_{(1)}^{kl_s}\}$, corresponding to all LR patches $\{x^{kl_s}\}$, shown in FIG. 10. Some of the most obvious estimation errors are present in some of the 'edge' patches, but beyond these obvious errors, subtle errors are present (and different) per the same image part. For example, if we concentrate on the mouth region, we'd see that it looks a little different across all 16 estimates.

FIG. 12 shows what we get if we compute the median of all 16 estimates of frame#31 shown in FIG. 11 vs. the initial estimate of the same frame (obtained using Lanczos interpolation).

But how did we compute each of the HR patches shown in FIG. 11? For example, how did we compute the HR patch $\hat{u}_{(1)}^{kl_s}$ k=31, s=4, and $l_s$=20? Let's highlight the patch in question in FIG. 13.

Extracting Local Training Sets ($\mathcal{K}$)

Recall that, in our solution, estimating a HR patch requires a local pair of (different resolution) dictionaries to be extracted from a pair of LR sequences (of different resolution). We already had LR sequence $\mathbb{X}$ (FIG. 6) and from which we created $\mathbb{Y}_{(1)}$ (FIG. 8). So now, we visualize how we extract the training sets $X^{kl_s}$ and $Y_{(1)}^{kl_s}$ from the LR sequences $\mathbb{X}$ and $\mathbb{Y}_{(1)}$, respectively, in preparation for computing the highlighted patch shown in FIG. 13.

First of all, recall parameters κ (the width of the temporal neighborhood of frames around frame k from which training LR patches are to be extracted) and b (2b+1 is the width and height, in pixels, of the spatial window whose center is defined by the location of the LR patch corresponding to the HR patch we need to estimate). Here, we choose κ=30 frames, and b=5 pixels. FIG. 14 illustrates the extraction process ($\mathcal{K}$) of example LR patches to be used as elements of the pair of training sets.

Learning the Dictionaries

With $(2b+1)^2=121$ LR patches extracted from each frame in a predefined temporal neighborhood of size κ=30 frames, the size of the entire training set $X^{kl_s}$ is 30×121=3,630 LR patches (similarly, training set $Y_{(1)}^{kl_s}$ has 3,630 LR patches).

However, we do not need all patches in a training set. Indeed, just by looking at FIG. 14, it becomes evident that most of the extracted patches are irrelevant, anyway. But then why do we extract so many LR patches? The point is to find LR patches that are similar to the LR patch we want to upsample, so the extraction process described here is our way for 'fishing' for good example LR patches. And although most of the 'catch' is useless, it doesn't matter as long as we have enough 'good' LR patches in our training set.

Before we proceed, here we use $M=N=2q^2=32$ as the number of (hopefully) 'good' enough LR patches to be chosen from each training set. All is left to do is define a measure of 'goodness'. The following steps summarize the dictionary "learning" process we described in Section 5 (A Working Solution).

First, execute the following pseudocode:

$$\text{For } i = 1: \kappa(2b+1)^2 \tag{99}$$

$$d_x[i] = \left\| \frac{X^{k\ell_s}[i]}{\|X^{k\ell_s}[i]\|} - \frac{x^{k\ell_s}}{\|x^{k\ell_s}\|} \right\|_1$$

$$d_y[i] = \left\| \frac{Y_{(1)}^{k\ell_s}[i]}{\|Y_{(1)}^{k\ell_s}[i]\|} - \frac{y_{(1)}^{k\ell_s}}{\|y_{(1)}^{k\ell_s}\|} \right\|_1$$

End where the LR patches $x^{k\ell_s}$ and $y_{(1)}^{k\ell_s}$ correspond to the HR patch you want to estimate (these are the highlighted areas in the left and right LR frames, respectively, shown in the middle row of FIG. 14).

The i-th entry in $d_x$ is thus the value of the L1 distance between the i-th normalized LR patch in training set $X^{k\ell_s}$ and normalized (reference) LR patch $x^{k\ell_s}$. Similarly, the i-th entry in $d_y$ is the value of the L1 distance between the i-th normalized LR patch in training set $Y_{(1)}^{k\ell_s}$ and normalized LR patch $y_{(1)}^{k\ell_s}$.

Second, pick the M LR patches, in the training set $X^{k\ell_s}$, that correspond to the smallest M entries in $d_x$. These are the atoms of your local primary dictionary $\Psi^{k\ell_s}$. Similarly, the atoms of the local secondary dictionary $\Phi_{(1)}^{k\ell_s}$ are the N LR patches, in the training set $Y_{(1)}^{k\ell_s}$, that correspond to the smallest N entries in $d_y$.

Third, since it's easier to work with orthonormal dictionaries, use SVD decomposition to orthonormalize the atoms of each dictionary. After converting atoms, of each dictionary, from their 2D form to their vector form, and stacking these (per dictionary) as column-vectors next to each other, we can use the following Matlab code to orthonormalize our dictionaries:

[$\Psi^{k\ell_s}$, ~, ~]=svd($\Psi^{k\ell_s}$, 0);

[$\Phi_{(1)}^{k\ell_s}$, ~, ~]=svd($\Phi_{(1)}^{k\ell_s}$, 0); (100)

FIG. 15 visualizes the pair of dictionaries we used to compute the highlighted patch in FIG. 13.

Computing the HR Patch

All the previous steps were taken to set the stage for the proposed structured subspace framework to do its work: converting a pair of (different resolution) LR dictionaries into a HR image. In the following, we describe the most straightforward application of the structured subspace solution.

First, construct the HR basis matrix $V^{k\ell_s}$ from the LR dictionary $\Psi^{k\ell_s}$, and the HR basis matrix $W_{(1)}^{k\ell_s}$ from the LR dictionary $\Phi_{(1)}^{k\ell_s}$, by running the following Matlab code:

$V^{k\ell_s}$=LR2HRbasis($\Psi^{k\ell_s}$, r, p, q, M);

$W_{(1)}^{k\ell_s}$=LR2HRbasis($\Phi_{(1)}^{k\ell_s}$, r, q, p, N); (101)

Recall that we chose $p=3$ (and thus $q=p+1=4$), $r=4$, and $M=N=2q^2=32$. LR2HRbasis is a predefined function written using Matlab as follows:

```
% function to construct HR basis from LR dictionary
function V = LR2HRbasis (PSI,r,p,q,M)
d = r*p*q;
PSI = reshape (PSI,r*q,r*q,M) ;      % this line converts
                                      % the vectorized
                                      % atoms (columns)
                                      % of PSI back to
                                      % their 2D form
                                                        (102)
V = zeros (d*d,p*p*M) ;
zrs = zeros (d,d,M) ;
c = 0;
for i = 1:p
  for j = 1:p
    c = c+1;
    atomZshift = zrs;
    atomZshift (i:p:end, j:p:end, :) = PSI;
    V(:, (c−1) *M+1:c*M) = reshape (atomZshift,d*d,M);
  end
end
```

Second, solve the following equation whichever meaningful way possible: $V^{k\ell_s}\underline{\alpha}_{(1)}^{k\ell_s}=W_{(1)}^{k\ell_s}\underline{\beta}_{(1)}^{k\ell_s}$. Recall:

$V^{k\ell_s}$ is the HR basis matrix that spans any HR image (patch) whose PPCs are spanned by the LR dictionary $\Psi^{k\ell_s}$.

$W_{(1)}^{k\ell_s}$ is the HR basis matrix that spans any HR image (patch) whose PPCs are spanned by another (different resolution) LR dictionary $\Phi_{(1)}^{k\ell_s}$.

$\underline{\alpha}_{(1)}^{k\ell_s}$ is the representation of (first estimate of) the HR image (patch) in terms of $V^{k\ell_s}$.

$\underline{\beta}_{(1)}^{k\ell_s}$ is the representation of the same HR image in terms of $W_{(1)}^{k\ell_s}$.

Solving this equation is the equivalent of searching for the pair of HR images (one image in span($V^{k\ell_s}$), and the other image in span($W_{(1)}^{k\ell_s}$)) that are 'closest' to each other. So what remains is to define the "distance measure", or the 'yardstick' with which distance is measured. We believe a good yardstick for measuring distance, in this context, is defined by optimization problem (72).

Using this yardstick (72), it just so happens that we do not need to construct V nor W, only the multiplication W*V is needed which, due to the particular structure of V and W, can be very efficiently computed using equations (62)-(68). However, generally speaking, other yardsticks one might choose to use (other than (72)) might require the explicit construction of V and W. For this reason, we shall ignore, in this demonstration, the special computational efficiency advantage imparted by (72).

Since we're working on patches, $x^{k\ell_s}$ is the reference LR image here (the highlighted square in the LR frame shown on the left of the middle row of FIG. 14) whose HR version (the highlighted square in FIG. 13) we seek to compute.

The following is the Matlab code we used for computing the HR image patch highlighted in FIG. 13.

$\hat{u}_{(1)}^{k\ell_s}$=computeHRpatch($V^{k\ell_s}$, $W_{(1)}^{k\ell_s}$, $\Psi^{k\ell_s}$, $x^{k\ell_s}$, $\mu_{(1)}^{k\ell_s}$, r, ,p, q, M); (103)

where the control parameter $\mu_{(1)}^{kl_s}$ is determined according to (91), and computeHRpatch is a predefined function as follows:

```
% function to solve Vα = Wβ, according to          (104)
% optimization problem (72).
function u = computeHRpatch(V, W, PSI, x, mu, p, M)
A = W'*V;
A = A'*A;
x = x(:);    % get the vector form of
             % the reference LR image.
b = PSI'*x;  % i.e. b = Ψ*x.
brep = repmat (mu/p/p/norm(b)*b,p*p,1);
                          % this is μ/‖Ψ*x‖ 𝒥*Ψ*x.
J = 1/p/p*repmat(eye(M), 1, p*p); % this is eqn (71).
J = J'*J;
E = zeros(p*p*M + 1); % construct the matrix in (74).
E(1:p*p*M, 1:p*p*M) = mu*J + eye(p*p*M) −A;
E(1:p*p*M, p*p*M + 1) = brep;
E(p*p*M + 1, 1:p*p*M) = brep';
E(p*p*M + 1, p*p*M + 1) = mu;
sigma = svd(E); sigma = sigma(end);
A = mu*J + (1 − sigma)*eye(p*p*M) −A;
brep = repmat(mu/p/p*b, p*p, 1);
alpha = A\brep; % this is eqn (73).
u = V*alpha;
u = reshap(u, r*p*q, r*p*q);  % get the 2D form of
                              % the estimate HR image.
```

Parallel Processing:

Thus far, we explained how we got the HR patch highlighted in FIG. 13, which is patch $\hat{u}_{(1)}^{kl_s}$ k=31, s=4, and $l_s$=20, but that's just one patch among 48 patches ($l_s$=1, ..., 48) per partitioning pattern s=4, and we have S=16 partitioning patterns with 48 patches per partitioning (FIG. 11). In our simple baseline, all of these HR patches are computed independently from each other, so if the computing hardware allows it, they can all be computed simultaneously, and for all K frames too. So if we have K=100 frames, we can compute 100*16*48=76,800 patches simultaneously, and then arrange them as 16 HR estimates per frame, and then compute the median of all 16 estimates per frame to get the first estimate of the our HR sequence $\hat{\mathbb{U}}_{(1)}$. Of course, this can also be done in series, computing one HR patches at a time. In any case, parallel computing is beyond the scope of this invention.

2nd and Subsequent Iterations

Compared to the first iteration, the second iteration (and subsequent iterations) are no different except for working with an updated estimate of the secondary LR sequence, which is obtained by simply decimating the previous estimate of the HR sequence (e.g. we get the updated sequence $\mathbb{Y}_{(2)}$ by decimating each frame in $\hat{\mathbb{U}}_{(1)}$ by a factor of q).

In particular, the primary LR sequence $\mathbb{X}$, remains the same for all iterations, so unless we adopt a different training set extraction strategy ($\mathcal{K}$) or a different dictionary learning procedure ($\mathcal{L}$) per iteration, there is no need to repeat the training/learning process of local primary LR dictionaries. For example, if we stored $\Psi^{kl_s}$ shown in FIG. 15, we do not need to repeat its extraction process for any iteration beyond the first one. This is why the symbol $\Psi^{kl_s}$ is missing the subscript (t).

Equation Solution Section

To solve the optimization problem (72) using Lagrange multipliers, we first rewrite (72) as $$\min_{\alpha,\beta}\left(\|V\underline{\alpha} - W\underline{\beta}\|^2 + \mu\left\|[\mathcal{J}\ \Psi^*\underline{x}]\begin{bmatrix}\alpha\\-1\end{bmatrix}\right\|^2\right) \text{ s.t. } \|\underline{\alpha}\|^2 = c > 0. \quad (A.1)$$

Now let $$\underline{\tilde{\alpha}} = \begin{bmatrix}\alpha\\-1\end{bmatrix} \quad (A.2)$$

$$\Rightarrow \underline{\alpha} = E\underline{\tilde{\alpha}},$$

where $$E=[I_{p^2M}\ \underline{0}] \in \mathbb{R}^{p^2M\times(p^2M+1)}, \quad (A.3)$$

Also, let $$R=[\mathcal{J}\ \Psi^*\underline{x}],$$

and rewrite (A.1) as $$\min_{\tilde{\alpha},\beta}(\|VE\underline{\tilde{\alpha}} - W\underline{\beta}\|^2 + \mu\|R\underline{\tilde{\alpha}}\|^2) \text{ s.t. } \|\underline{\tilde{\alpha}}\|^2 = \tilde{c} > 0. \quad (A.5)$$

Let $f(\underline{\tilde{\alpha}},\underline{\beta})=\|VE\underline{\tilde{\alpha}}-W\underline{\beta}\|^2+\mu\|R\underline{\tilde{\alpha}}\|^2$, and recall (54), (55). Therefore, the objective function f ($\underline{\tilde{\alpha}},\underline{\beta}$) can be rewritten as $$f(\underline{\tilde{\alpha}},\underline{\beta})=\underline{\tilde{\alpha}}^*(E^*E+\mu R^*R)\underline{\tilde{\alpha}}-2\underline{\tilde{\alpha}}E^*V^*W\underline{\beta}+\|\underline{\beta}\|^2. \quad (A.6)$$

Also, let $$g(\underline{\tilde{\alpha}},\underline{\beta})=\|\underline{\tilde{\alpha}}\|^2-\tilde{c}. \quad (A.7)$$

Since we only have one constraint (A.7), there is only one Lagrange multiplier, which we denote with λ, and the Lagrangian is therefore $$\mathcal{L}_{(\underline{\tilde{\alpha}},\underline{\beta},\lambda)}=f(\underline{\tilde{\alpha}},\underline{\beta})-\lambda g(\underline{\tilde{\alpha}},\underline{\beta}). \quad (A.8)$$

Now the gradient of f($\underline{\tilde{\alpha}},\underline{\beta}$), with respect to $\underline{\tilde{\alpha}}$ and $\underline{\beta}$ is $$\nabla_{\tilde{\alpha},\beta}f = \begin{bmatrix}2(E^*E+\mu R^*R)\underline{\tilde{\alpha}}-2E^*V^*W\underline{\beta}\\2(\underline{\beta}-W^*VE\underline{\tilde{\alpha}})\end{bmatrix} \quad (A.9)$$

Also, $$\nabla_{\tilde{\alpha},\beta}g = \begin{bmatrix}2\underline{\tilde{\alpha}}\\\underline{0}\end{bmatrix} \quad (A.10)$$

Therefore, $$\nabla_{\tilde{\alpha},\beta,\lambda}\mathcal{L} = 2\begin{bmatrix}(E^*E+\mu R^*R)\underline{\tilde{\alpha}}-E^*V^*W\underline{\beta}-\lambda\underline{\tilde{\alpha}}\\\underline{\beta}-W^*VE\underline{\tilde{\alpha}}\\0.5(\tilde{c}-\|\underline{\tilde{\alpha}}\|^2)\end{bmatrix}. \quad (A.11)$$

$$\nabla_{\tilde{\alpha},\beta,\lambda}\mathcal{L} = 0 \Rightarrow (E^*E+\mu R^*R)\underline{\tilde{\alpha}}-E^*V^*W\underline{\beta} = \lambda\underline{\tilde{\alpha}}, \quad (A.12)$$

$$\underline{\beta}W^*VE\underline{\tilde{\alpha}} \quad (A.13)$$

$$\|\underline{\tilde{\alpha}}\|^2 = \tilde{c}. \quad (A.14)$$

Combining (A.12), (A.13), we get $$(E^*E + \mu R^*R - E^*V^*WW^*VE)\underline{\hat{\alpha}} = \lambda \underline{\hat{\alpha}}. \qquad (A.15)$$

We can now obtain the value of the objective function, by plugging (A.13) in (A.6), and then using (A.15) and (A.14)

$$\underline{\hat{\alpha}}^*\underbrace{(E^*E + \mu R^*R - E^*V^*WW^*VE)\underline{\hat{\alpha}}}_{\lambda\underline{\hat{\alpha}}} = \lambda\|\underline{\hat{\alpha}}\|^2 = \lambda\underbrace{\hat{c}}_{c}. \qquad (A.16)$$

Now note that $$E^*E = \begin{bmatrix} I_{p^2M} & \underline{0} \\ \underline{0} & 0 \end{bmatrix}, \quad E^*V^*WW^*VE = \begin{bmatrix} V^*WW^*V & \underline{0} \\ \underline{0} & 0 \end{bmatrix}, \qquad (A.3)$$

and $$R^*R = \begin{bmatrix} \mathcal{J}^*\mathcal{J} & \mathcal{J}^*\Psi^*\underline{x} \\ (\mathcal{J}^*\Psi^*\underline{x})^* & \|\Psi^*\underline{x}\|^2 \end{bmatrix}, \qquad (A.4)$$

and therefore equation (A.15) is rewritten as $$\begin{bmatrix} \mu\mathcal{J}^*\mathcal{J} + I - V^*WW^*V & \mu\mathcal{J}^*\Psi^*\underline{x} \\ \mu(\mathcal{J}^*\Psi^*\underline{x})^* & \mu\|\Psi^*\underline{x}\|^2 \end{bmatrix}\underline{\hat{\alpha}} = \lambda\underline{\hat{\alpha}}, \qquad (A.17)$$

Since any singular pair of the (symmetric) matrix in (A.17) is a solution, and since we seek to minimize the error (A.16), we pick the solution $\underline{\hat{\alpha}} = \sqrt{\hat{c}}\underline{v}$, where $\underline{v}$ is the last singular vector of the matrix in (A.17), with associated (smallest) singular value $\sigma_v$ (and thus $$\sqrt{\hat{c}} = -\frac{1}{e},$$

where e is the last element in $\underline{v}$).

Now recall (A.2) and rewrite (A.17) as $$\begin{bmatrix} \mu\mathcal{J}^*\mathcal{J} + I - V^*WW^*V & \mu\mathcal{J}^*\Psi^*\underline{x} \\ \mu(\mathcal{J}^*\Psi^*\underline{x})^* & \mu\|\Psi^*\underline{x}\|^2 \end{bmatrix}\begin{bmatrix} \underline{\alpha} \\ -1 \end{bmatrix} = \sigma_v\begin{bmatrix} \underline{\alpha} \\ -1 \end{bmatrix}. \qquad (A.18)$$

The top part of equation (A.18) is $$(\mu\mathcal{J}^*\mathcal{J} + I - V^*WW^*V)\underline{\hat{\alpha}} - \mu\mathcal{J}^*\Psi^*\underline{x} = \sigma_v\underline{\hat{\alpha}} \qquad (A.19)$$

and therefore $$\underline{\hat{\alpha}} = \mu[\mu\mathcal{J}^*\mathcal{J} + (1 - \sigma_v)I - V^*WW^*V]^{-1}(\mathcal{J}^*\Psi^*\underline{x}). \qquad (A.20)$$

Now, for numerical stability reasons, the computation of the smallest singular value of the matrix in A.17 might be inaccurate (because the last row and the last column in the matrix in A.17 have much higher values compared to $\mu\mathcal{J}^*\mathcal{J} + I - V^*WW^*V$), so instead of using $\Psi^*\underline{x}$ in optimization problem A.1 we use its normalized version $$\frac{\Psi^*\underline{x}}{\|\Psi^*\underline{x}\|}.$$

So equation A.18 becomes $$\begin{bmatrix} \mu\mathcal{J}^*\mathcal{J} + I - V^*WW^*V & \frac{\mu}{\|\Psi^*\underline{x}\|}\mathcal{J}^*\Psi^*\underline{x} \\ \frac{\mu}{\|\Psi^*\underline{x}\|}(\mathcal{J}^*\Psi^*\underline{x})^* & \mu \end{bmatrix}\begin{bmatrix} \underline{\alpha} \\ -1 \end{bmatrix} = \sigma\begin{bmatrix} \underline{\alpha} \\ -1 \end{bmatrix}. \qquad (A.21)$$

where $\sigma$ is the smallest singular value the matrix in A.21. Therefore, the corresponding final solution (after scaling back by $\|\Psi^*\underline{x}\|$) is $$\underline{\hat{\alpha}} = \mu[\mu\mathcal{J}^*\mathcal{J} + (1-\sigma)I - V^*WW^*V]^{-1}(\mathcal{J}^*\Psi^*\underline{x}). \qquad (A.22)$$

System Requirements for Implementing Algorithm on Laptop

Laptop information:
OS Name Microsoft Windows 10 Home Version 10.0.17134 Build 17134
System Manufacturer Dell Inc.
System Model G3 3579
System Type x64-based PC
Processor Intel(R) Core(TM) i7-8750H CPU @ 2.20GHz, 2208 Mhz, 6 Core(s).
Installed Physical Memory (RAM) 16.0 GB
Matlab information:
MATLAB Version 9.4 (R2018a)
Add-on toolbox: Parallel Computing Toolbox Version 6.12 (R2018a)
This embodiment of the invention uses the very basic Matlab package+the parallel computing toolbox to take advantage of the laptop's 6-core CPU.
Matlab is known as a scientific computing programming language.
The computations in the algorithm are basic, so it can be done using other (free) programming platforms such as Anaconda (the Python distribution) or C or Java, etc.
The 100 frame Suzie sequence in the experiment section can be upsampled using Matlab+the listed laptop in a couple of hours (or even half an hour if we change some parameters and sacrifice a bit of quality for speed). Nevertheless, the algorithm's complexity is considered comparatively low (compared to the norm in the field of upsampling), but it is still too high for real-time/low-power applications, which makes optimization for faster computations potentially very useful. One might also want to consider other solutions (beyond computational optimization). For instance, images captured by a low power device (e.g. an iPhone or a satellite) can be dealt with using cloud computing.
As much as ×10-100 speed up can be obtained by converting Matlab code to C code.
The algorithm is parallelizable, so besides writing the algorithm in C, using a GPU (or the cloud) can considerably speed up calculations.

What is claimed is:

1. A computer implemented method of denoising digital images, comprising the steps of:
   upsampling an input sequence of frames, using a structured subspace framework that leverages pairs of dictionaries, respectively, wherein one member of each of said pairs of dictionaries is directly created, and a second member of each of said pairs of dictionaries is indirectly created, from the input sequence of frames to create denoised versions of said frames.

2. The method of claim 1, wherein each pair of said dictionaries is comprised of a first dictionary that is learned from the input sequence of frames, and a second, different-resolution, dictionary that is learned from a second sequence of frames obtained by decimating the input sequence.

3. The method of claim 2, wherein the structured subspace framework is based upon estimating at least one of two representations ($\underline{\alpha}$ and $\underline{\beta}$) of a denoised image in terms of two bases (V and W), by solving $$V\underline{\alpha} = W\underline{\beta}$$

where V is the basis matrix that spans the subspace of all images whose polyphase components (PPCs) are spanned by atoms of the first dictionary; and W is a second basis matrix spanning the subspace of all images whose PPCs are spanned by the atoms of the second dictionary.

4. The method of claim 3, wherein said denoised frames can be estimated by estimating patches thereof using patch-based processing, where the structured subspace framework is applied locally per patch to leverage a pair of local dictionaries learned per patch.

5. The method of claim 4, wherein the first dictionary is learned from local image patches extracted from the input sequence of frames, whereas the second dictionary is learned from local patches extracted from the second, different-resolution, sequence obtained by decimating the input sequence.

6. The method of claim 2, wherein the estimation of the denoised sequence is repeated, such that the input sequence for a new iteration is a decimated version of the output sequence of the previous iteration.

7. The method of claim 1, further comprising the step of enhancing said denoised versions by creating a first dictionary learned from the input sequence of original frames, creating a second dictionary learned from the denoised versions, and utilizing the structured subspace framework to leverage both dictionaries to create enhanced denoised frames of said denoised versions.

8. A computer implemented computational method for denoising digital images by creating a sequence of denoised frames from an input sequence of frames, using a structured subspace framework that leverages pairs of dictionaries, comprising the steps of:
scanning into a computer memory an input sequence of frames;
creating a sequence of denoised frames using said structured subspace framework by estimating representations of denoised images in terms of pairs of bases, each of which embeds a different dictionary, by solving, per image, the equation:

$$V\underline{\alpha} = W\underline{\beta}$$

where:
V is the first basis matrix constructed such that it spans any image whose polyphase components (PPCs) are spanned by a first dictionary $\Psi$;
W is the second basis matrix constructed such that it spans any image whose PPCs are spanned by another different resolution second dictionary $\Phi$;
$\underline{\alpha}$ is the representation of the denoised image in terms of V; and,
$\underline{\beta}$ is the representation of the denoised image in terms of W;

multiplying the basis matrix V with the representation $\underline{\alpha}$, computed from the previous step, to obtain the denoised image.

9. The method of claim 8, further comprising:
dividing a frame, to be upsampled (for denoising), into patches, and applying the upsampling process for each individual patch, independently of other patches.

10. The method of claim 9, wherein:
said patches have size d×d pixels, and overlap, vertically and horizontally, by pq pixels, where:
d=rpq, p is the desired upsampling factor, q=p+1, and r is a user-defined factor that determines the size of patches.

11. The method of claim 10, wherein:
per patch, a first dictionary is learned from a first set of local image patches that are extracted from the input sequence of images, whereas a second dictionary is learned from a second set of local image patches that are extracted from the second different-resolution sequence obtained by decimating the input sequence, in accord with the steps of:
extracting a first set of patches from a spatiotemporal neighborhood within the input sequence, where said neighborhood is centered at the spatiotemporal location of the patch that is to be upsampled into a denoised version, and patches extracted from a frame, that belong to said neighborhood, can overlap vertically and horizontally by at most rq−1 pixels; wherein the M patches, from the first set of extracted patches, that are most similar to the patch that is to be upsampled into the denoised version, are used as atoms of the first dictionary;
extracting a second set of patches from a spatiotemporal neighborhood within the second different-resolution sequence, where said neighborhood is centered at the spatiotemporal location of the patch, in the second sequence, that corresponds to the patch that is to be upsampled into the denoised version, and patches extracted from a frame, that belong to said neighborhood, can overlap vertically and horizontally by at most rp−1 pixels;
wherein the N patches, from the second set of extracted patches, that are most similar to the patch in the second sequence that corresponds to the patch that is to be upsampled into the denoised version, are used as atoms of the second dictionary.

12. The method of claim 10, wherein, a denoised frame is obtained by:
tiling its upsampled patches in their respective locations, forming $r^2$ different estimates of the same denoised frame; and,
combining all $r^2$ estimates into one single denoised frame.

13. The method of claim 12, where the denoised frames are decimated by p to create an updated version of the input sequence, and the solution is repeated, resulting in updated estimates of denoised frames until the denoised frames stop getting any better in accord with a predetermined criteria defined as when a user-defined number of iteration is exhausted.

* * * * *